US010489762B2

(12) United States Patent
Mohsenzadeh

(10) Patent No.: US 10,489,762 B2
(45) Date of Patent: Nov. 26, 2019

(54) SYSTEM AND METHOD FOR AUTOMATED PROVISIONING BILL PRESENTMENT AND PAYMENT

(75) Inventor: Hossein Mohsenzadeh, Medford, MA (US)

(73) Assignee: Aliaswire, Inc., Burlington, MA (US)

(*) Notice: Subject to any disclaimer, the term of this patent is extended or adjusted under 35 U.S.C. 154(b) by 303 days.

(21) Appl. No.: 13/440,973

(22) Filed: Apr. 5, 2012

(65) Prior Publication Data
US 2013/0268434 A1 Oct. 10, 2013

(51) Int. Cl.
G06Q 40/00 (2012.01)
G06Q 20/14 (2012.01)
G06Q 30/04 (2012.01)

(52) U.S. Cl.
CPC ............ *G06Q 20/14* (2013.01); *G06Q 30/04* (2013.01)

(58) Field of Classification Search
CPC ........ G06Q 40/02; G06Q 40/08; G06Q 40/00; H04W 4/24
See application file for complete search history.

(56) References Cited

U.S. PATENT DOCUMENTS

| | | | | |
|---|---|---|---|---|
| 5,699,528 A * | 12/1997 | Hogan | ................. | G06Q 20/04 705/40 |
| 5,920,847 A * | 7/1999 | Kolling | ................. | G06Q 20/02 705/40 |
| 6,289,322 B1 * | 9/2001 | Kitchen | ................. | G06Q 20/04 705/34 |
| 6,304,857 B1 * | 10/2001 | Heindel | ................. | G06Q 30/04 705/34 |
| 7,028,008 B2 * | 4/2006 | Powar | ................. | G06Q 20/02 705/40 |
| 7,103,577 B2 * | 9/2006 | Blair | ................. | G06Q 20/02 235/375 |
| 7,353,203 B1 * | 4/2008 | Kriplani | ................. | G06Q 20/02 705/39 |
| 7,620,602 B2 * | 11/2009 | Jakstadt et al. | ................. | 705/40 |
| 7,945,491 B2 * | 5/2011 | Sharma | ................. | G06Q 20/02 705/34 |
| 8,630,947 B1 * | 1/2014 | Freund | ................. | 705/40 |
| 2001/0037295 A1 * | 11/2001 | Olsen | ................. | G06Q 20/102 705/40 |
| 2002/0019808 A1 * | 2/2002 | Sharma | ................. | 705/40 |
| 2002/0052840 A1 * | 5/2002 | Kitchen | ................. | G06Q 20/04 705/40 |
| 2002/0065772 A1 * | 5/2002 | Saliba | ................. | G06Q 20/10 705/40 |

(Continued)

FOREIGN PATENT DOCUMENTS

WO WO 2010056207 A2 * 5/2010 ............. G06Q 20/04

OTHER PUBLICATIONS

Kendle, Jeanine; "Mother, daugher share classroom experience"; Daily Record; Wooster, Ohio, Jan. 28, 2011 (Year: 2011).*

*Primary Examiner* — Edward Chang
(74) *Attorney, Agent, or Firm* — Behmke Innovation Group LLC; James Behmke; Stephen D. LeBarron

(57) ABSTRACT

A system and method for self or automated provisioning bill presentment and payment is provided. Billing software executing on a central billing server enables billers to configure a bill presentment and payment website to enable multiple forms of electronic payment and presentment to be made without the need for programming customized applications.

52 Claims, 23 Drawing Sheets

(56) References Cited

U.S. PATENT DOCUMENTS

| | | | |
|---|---|---|---|
| 2002/0128968 A1* | 9/2002 | Kitchen | G06Q 20/04 705/40 |
| 2002/0198848 A1* | 12/2002 | Michener | G06Q 20/04 705/75 |
| 2003/0004872 A1* | 1/2003 | Gardi | G06Q 20/102 705/40 |
| 2003/0191701 A1* | 10/2003 | Haseltine et al. | 705/34 |
| 2003/0220871 A1* | 11/2003 | Clarke | G06Q 20/102 705/40 |
| 2004/0059673 A1* | 3/2004 | Kitchen | G06Q 20/04 705/40 |
| 2004/0111337 A1* | 6/2004 | Feeney | G06Q 10/087 705/28 |
| 2004/0133514 A1* | 7/2004 | Zielke | G06Q 20/10 705/40 |
| 2004/0143548 A1* | 7/2004 | Meier | G06Q 20/00 705/40 |
| 2004/0210520 A1* | 10/2004 | Fitzgerald | G06Q 20/04 705/40 |
| 2006/0149671 A1* | 7/2006 | Nix | G06Q 20/04 705/40 |
| 2010/0191602 A1* | 7/2010 | Mikkelsen | G06Q 20/322 705/14.64 |
| 2010/0205078 A1* | 8/2010 | Lawrence | G06Q 20/02 705/34 |
| 2011/0035303 A1* | 2/2011 | Jakstadt | G06Q 20/10 705/34 |
| 2011/0246373 A1* | 10/2011 | Prakash | G06Q 20/102 705/75 |

\* cited by examiner

FIG. 4B

DirectBiller.com: Account Setup – Internet Explorer

File Edit View Favorites Tools Help

Back ▼ | Search ☆ Favorites

Address http:// 68.236.111.140/directbiller/coreInformation.do

Username: [ ]  Password: [ ] Login

Bill Payment UI

| Home | Account Setup | Contact Us | Help |

DirectBiller Account Setup: Core Information

Contact Information
Core Information — 412
Payer Login
Payment Integration
Remittance Information
Look & Feel
Finish

Bill Presentment Options

Select one of the options below to determine the type of billing site to be built.

● Direct Payment — 502
  Collect payments from your customers and direct deposit to your account. This requires minimal integration work.

○ Bill Presentment and Payment — 504
  Present invoice information to your customers and collect payments from your customers and direct deposit to your account. This requires that you extract invoice information from your current billing system to be presented here.

☑ Allow payments by phone — 506
  Select this checkbox if you want to allow your customers to make payments by phone.

Bill Processing Setup

Please indicate how invoice numbers should be handled.

● No invoice numbers    User accounts are sufficient to identify payments.

Done | Internet

DirectBiller.com: Account Setup – Internet Explorer

File Edit View Favorites Tools Help

Address http://68.236.111.140/bills-opp/directbiller/lookandfeelInformation.c

Home   Create New Account   Forgot Password
Username:   Password:   Login

Bill Payment UI

| Home | Account Setup | Contact Us | Help |

DirectBiller Account Setup: Look & Feel Information

- Contact Information
- Core Information
- Payer Login
- Payment Integration
- Remittance Information
- Look & Feel
- Finish

420

Look and Feel Information

Please fill in the information relating to your new site's look and feel.

Company logo:  [_____] [ Browse... ]  — 902
Your company logo in gif or jpg format. The logo will be adjusted to fit in 170 pixels wide, 25 pixels high. Please adjust accordingly.

Audio recording of Biller name: [_____] [ Browse... ]  — 904
Your company sound file that your customers will hear when calling into your voice billing system. Your spoken logo should be a .WAV file, suitable to be used in phone conversations.

512   450
[ <Back ]   [ Next > ]

Done   | O Internet

Bill Payment Schedule for AcmeTech East

Payment Method

Enable | Schedule
☐ Schedule automatic bill payments for AcmeTech East
Schedule the payment [5 ▼] days before the bill payment is Due. Note that the bill payment needs to be scheduled at least 5 days prior to the bill due date to ensure the bill is paid on time.

Select Method ▼ — 1720

☐ Do not pay the bill if it is more than $ [____]

Alerts for AcmeTech East

Enable | Alert — 1718 | Alert Method

☐ Notify me when new bills arrive for AcmeTech East. Send me an alert [10 ▼] before the bill payment is due. | ⦿ Email ○ SMS ○ Both Please select the method by which you would like to be notified when automatic payments are made to AcmeTech East. Note that this alert only applies if you have setup automatic payments to AcmeTech East. | ⦿ Email ○ SMS ○ Both Please select the method by which you would like to be notified when automatic payments to AcmeTech East fail. Note that this alert only applies if you have setup automatic payments to AcmeTech East. | ⦿ Email ○ SMS ○ Both

1716

By clicking "Submit" below, you authorize Aliaswire to process payments and notifications as described above for the purposes of making payments to this biller.

FIG. 17B

SYSTEM AND METHOD FOR AUTOMATED PROVISIONING BILL PRESENTMENT AND PAYMENT

FIELD OF THE DISCLOSURE

The present disclosure is directed to electronic commerce systems and, more particularly, to self provisioning bill presentment and payment systems.

BACKGROUND OF THE DISCLOSURE

Billing systems including, e.g., electronic billing and payment systems, are a vital part of any commercial business enterprise's infrastructure. Typically, business enterprises generate revenue by billing customers and receiving payments. As such, the need for payment systems represents the lifeblood of a company's financial revenue stream. When a commercial enterprise would like to use an electronic billing and payment system, the enterprise may have a software development team generate a custom software solution to interface and interact with the accounting systems utilized by the enterprise. Such custom development software may require hundreds of thousands of dollars and/or may require months of time to completely implement a billing and payment system. Further, the developed billing system is often "hard coded" or static into a particular billing paradigm, resulting in additional costs and development time to modify any of functionality.

A further disadvantage is that such billing systems require continual maintenance and additional programmer time to modify any aspects of the billing system. Thus, for example, should a commercial enterprise desire to begin accepting payment via an additional entry point, e.g., payment by credit cards, additional software development may be required, with the concomitant issues of new software errors and/or potential downtime of the billing system while it is being tested and implemented.

SUMMARY OF THE DISCLOSURE

Embodiments of the present disclosure include providing a system and method for self or automated provisioning bill presentment and payment. Such embodiments may include a billing software executing on a central billing server enables billers, business organizations that desire to send bills to customers, to self provision an automated bill presentment and payment system, such as a website, for use in revenue generation. In an illustrative embodiment of the present disclosure, the central billing server is implemented on a computer server. Throughout this disclosure the term "bill" and "invoice" may be used interchangeably. Further, mobile device may be used to mean a mobile phone smart phone, tablet computer, etc. or any other mobile device known to persons of ordinary skill in the art.

By self or automated provisioning it is meant that the system may be configured by the user or biller without a need for custom programming and/or software development. In doing so, the biller configures the billing software by selecting a billing model and setting options as to how bills are uploaded to the billing system, data is collected from the system as well as how payers may make payments. Further, the billing software enables a biller to configure the look and feel of a website to enable customized appearances. Once the look and feel is configured, a test payment site may be implemented via the billing software to enable test payments to be made to, e.g., provide proof of concept functionality.

Once the test site has been verified, the system may be activated and may go live with real bill presentment and payment to customers of the biller.

The billing software may also enable billers to publish their invoices into and or receive payments from an Aggregator Payment and/or Presentment Network (APPN). APPN includes banks and portals or companies that provide Aggregator Payment and/or Presentment services such as Mastercard® RPPS, FIS, Fiserv® or Jack Henry®. APPNs and the billing software allow billers to present bills and/or collect payment at the bank or third party (e.g. facilitator) website or hosted website and enables bank or third party customers to pay multiple bills from such a website site, for example.

Once configured, the billing software presents the bill presentment and payment website to users and provides functionality for operatively managing bill payment and presentment. Should any upgrade or modification to the bill presentment/payment website be made, the billing software dynamically manages the upgrade transition so that it is transparent to payers utilizing the system.

Although the billing software may be described in the present disclosure as implementing a bill presentment and payment system with web interfaces, such billing system and software may configure and support multiple interfaces in addition to a World Wide Web browser, which may include but is not limited to an interactive voice response (IVR) system, agent based services, mobile applications including WAP, SMS and mobile applications.

Embodiments of the disclosure include a method for managing electronic bill presentment and payment using a billing software implemented by a computer server. The billing software may include a bill presentment and bill payment capability. The method includes providing, by the billing software, one or more communication interfaces to one or more customers of a biller. In addition, the method may include coupling the billing software to one or more gateways. Also, the method may include provisioning one or more billers on the billing software and selecting one or more billing models associated with the bill presentment and bill payment capability. Moreover, the method may include configuring payor workflow of the bill presentment and bill payment capability based on the selected billing model by the billing software. Further, the method may include processing payments for the one or more billers through the one or more gateways.

In addition, provisioning may include setting options associated with the bill presentment and payment capability. Also, the one or more communication interfaces is selected from the group consisting of web, IVR, SMS, WAP, mobile software application or a combination thereof.

Moreover, the one or more gateways provide network interfaces to payment networks such that the one or more gateways process payment transactions for a channel. Also, the payment networks are selected from the group consisting of an aggregator presentment and payment network (APPN), credit card, electronic funds transfer (EFT) network, credit card network and an Automated Clearing House (ACH) network.

The method may also include presenting one or more bills from the biller using the billing software to a customer of the biller through an aggregator presentment and payment network (APPN) as well as receiving payment information by the billing software from an aggregator presentment and payment network APPN for the customer of the biller and causing the crediting of payment to the customer's account using the billing software. Further, the one or more billing models associated with the bill presentment and bill payment capability can be selected from the group consisting of bill payment without bill presentment, bill payment with short presentment, bill presentment without bill payment, bill presentment with bill payment or combination thereof. In addition, the provisioning of the billing software is provided by one of a group consisting of the channel for a biller, the biller of a channel, a facilitator, or a biller.

Embodiments of the disclosure may include a system for managing bill presentment and payment. The system may include a billing software executing on one or more computer servers as well as one or more communication interfaces coupled to a billing software providing a bill presentment and bill payment capability to one or more customers of the billers. The system may further include one or more gateway interfaces coupled to the billing software. In addition, the system includes provisioning one or more billers on the billing software which includes selecting one or more billing models associated with the bill presentment and bill payment capability. Moreover, the system includes configuring payor workflow of the bill presentment and bill payment capability based on the selected billing model as well as the one or more gateway interfaces processing payments for the one or more billers.

In addition, the provisioning includes setting options associated with the bill presentment and payment capability. Also, the one or more communication interfaces is selected from the group consisting of web, IVR, SMS, WAP, mobile software application or a combination thereof. Moreover, the one or more gateway interfaces provide network interfaces to payment networks and the one or more gateways process payment transactions for a channel such that the payment networks are selected from the group consisting of an aggregator presentment and payment network (APPN), an electronic funds transfer (EFT) network, credit card network and an Automated Clearing House (ACH) network. Further, the billing software presents one or more bills from a biller to a customer of the biller through an aggregator presentment and payment network (APPN). In addition, the billing software receives payment information from an aggregator presentment and payment network APPN for the customer of the biller; and causes the crediting of payment to the customer's account.

Moreover, the one or more billing models associated with the bill presentment and bill payment capability can be selected from the group consisting of bill payment without bill presentment, bill payment with short presentment, bill presentment without bill payment, bill presentment with bill payment or combination thereof. Further, the provisioning of biller on the billing software is provided by one of a group consisting of the channel for a biller, the biller of a channel, a facilitator, or a biller.

Embodiments of the disclosure include a system for managing bill presentment and payment. The system includes a computer server executing a billing software as well as one or more communication interfaces coupled to the billing software to provide the bill presentment and bill payment capability to one or more billers. Further, the billing software includes a bill presentment and bill payment capability and provisioning one or more billers on the billing software which includes selecting one or more billing models associated with the bill presentment and bill payment capability as well as configuring payor workflow of the bill presentment and payment capability based on the selected billing model. In addition, the provisioning of the billing software includes setting options associated with the bill presentment and payment capability.

Moreover, the billing software generates an electronic message that includes bill information and sends the electronic message to a mobile device such that the electronic message can be selected from the group consisting of a SMS message, text message, or voice message. The billing software may generate a second electronic message and sends the second electronic message to a mobile device, the second electronic message provides a hyperlink to a website managed by the billing software for a customer to view a bill. Further, the billing software receives and stores payment information associated with a customer of the biller wherein payment information can be selected from the group consisting of credit card information, debit card, information, prepaid card information, banking card information or ACH information. In addition, the billing software receives payment instructions in a third electronic message from a mobile device across a communication network and processes the payment based on payment instructions and payment information. Moreover, the third electronic message is routed to the billing software across the communication network based on a short code. The payment instructions include payment authorization information from a group consisting of a password, special phrase, PIN, account alias, or a combination thereof.

Further, the one or more billing models associated with the bill presentment and bill payment capability can be selected from the group consisting of bill payment without bill presentment, bill payment with short presentment, bill presentment without bill payment, bill presentment with bill payment or combination thereof. In addition, the system may include one or more payment networks coupled to the computer server wherein the payment networks are selected from the group consisting of an electronic funds transfer (EFT) network, credit card network, aggregator presentment and payment network (APPN), and an Automated Clearing House (ACH) network. Moreover, the provisioning of the billing software is provided by one of a group consisting of the channel for a biller, biller, a facilitator, or a biller.

Embodiments of the disclosure include a system for managing bill presentment and payment. The system includes a computer server coupled to a communication network, the computer server executing (i) a billing software having a bill presentment and bill payment capability wherein provisioning one or more billers on the billing software includes selecting one or more billing models associated with the bill presentment and bill payment capability as well as configuring payor workflow of the bill presentment and payment capability based on the selected billing model. Further, the system includes one or more communication interfaces coupled to the billing software to provide the bill presentment and bill payment capability to one or more billers.

Moreover, the provisioning of the billing software includes setting options associated with the bill presentment and payment capability. In addition, the system includes a presentment device coupled to the computer server through a communication network. Further, IVR call flows are configured by the billing software based on a selected billing model. The system also includes a payment server coupled to the billing software wherein the payment server receives from the billing software one or more payment instructions to debit a customer account. In addition, the one or more communication interfaces is selected from the group consisting of web, IVR, SMS, WAP, mobile software application or a combination thereof.

Moreover, the presentment device is selected from the group consisting of a tablet computer, mobile phone, and smart phone wherein a software application capable of presenting and paying bills resides on the presentment device. Further, the one or more billing models associated with the bill presentment and bill payment capability can be selected from the group consisting of bill payment without bill presentment, bill payment with short presentment, bill presentment without bill payment, bill presentment and bill payment or combination thereof.

Also, the billing software includes a routing engine and the billing software accesses configuration parameters for a channel and the routing engine routes payment instructions to a gateway based on the configuration parameters such that the configuration parameters include channel partner information for the routing engine to route payment instructions to a gateway based on channel partner information.

The foregoing summary is illustrative only and is not intended to be in any way limiting. In addition to the illustrative aspects, embodiments, and features described above, further aspects, embodiments, and features will become apparent by reference to the drawings and the following detailed description

BRIEF DESCRIPTION OF THE DRAWINGS

The accompanying drawings, which are incorporated in and constitute part of this specification, illustrate embodiments of the disclosure and together with the description serve to explain the principles of the present disclosure. The embodiments illustrated herein are presently preferred, it being understood, however, that the disclosure is not limited to the precise arrangements and instrumentalities shown, wherein:

FIGS. 4A-B are screenshots of a graphical user interface (GUI) window illustrating self provisioning of contact information in accordance with an illustrative embodiment of the present disclosure;

FIGS. 5A-5C are screenshots of a GUI window illustrating self provisioning of bill presentment and processing options in accordance with an illustrative embodiment of the present disclosure;

FIGS. 9A-9B are screenshots of a GUI window illustrating self provisioning of look and feel information in accordance with an illustrative embodiment of the present disclosure;

FIGS. 17A-17B are screenshots of a GUI window illustrating payee information in accordance with an illustrative embodiment of the present disclosure.

DETAILED DESCRIPTION OF AN ILLUSTRATIVE EMBODIMENT

Figure 1:
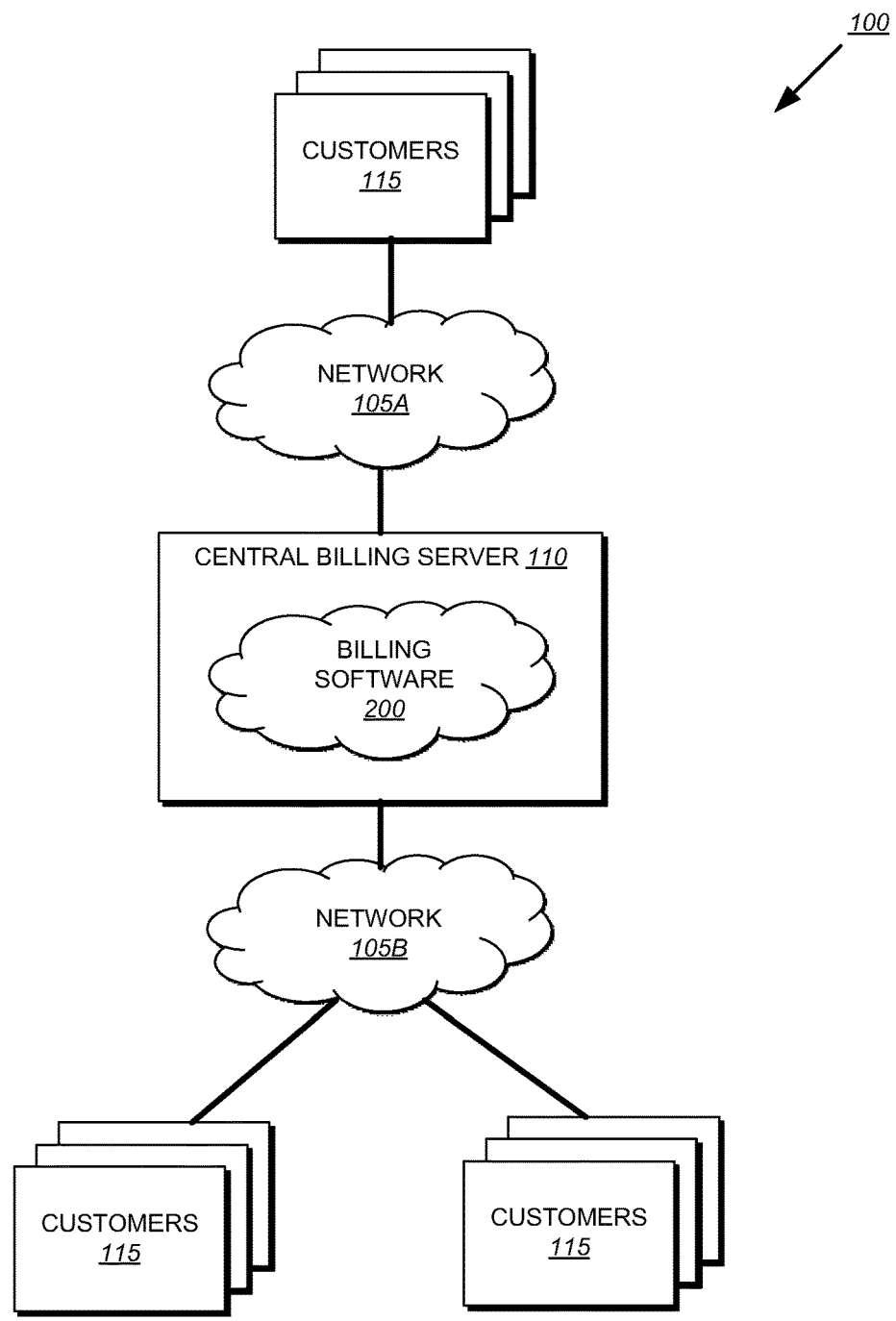
FIG. 1 is a schematic block diagram of an exemplary bill payment environment in accordance with an illustrative embodiment of the present disclosure.

In the following detailed description, reference is made to the accompanying drawings, which for a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of difference configurations, all of which are explicitly contemplated herein. Further, in the following description, numerous details are set forth to further describe and explain one or more embodiments. These details include system configurations, block module diagrams, flowcharts (including transaction diagrams), and accompanying written description. While these details are helpful to explain one or more embodiments of the disclosure, those skilled in the art will understand that these specific details are not required in order to practice the embodiments.

A. Billing System Environment

FIG. 1 is a schematic block diagram of an exemplary billing presentment and payment system environment 100 in accordance with an illustrative embodiment of the present disclosure. The environment 100 includes a central billing server 110 that executes billing software 200, described further below in reference to FIGS. 2A and 2B. Illustratively, the central billing server 110 is a computer server provided by, e.g., a software vendor of the billing software 200. Alternative embodiments also include the central billing server 110 and billing software 200 to be developed by a biller itself or third parties such as financial institution, print and mail organizations, facilitators, etc. It should be noted that the central billing server 110 may be implemented as a single computer or may be implemented using alternate computer architecture techniques including, e.g., a distributed/grid system, a computing cluster, etc. As such, the description of the central billing server 110 being a single server should be taken as exemplary.

Connected to the central billing server 110 is network 105A that is also operatively interconnected with one or more customers or customer devices 115. The network 105A may comprise a local area network (LAN), a wide area network (WAN), such as the well-known Internet, a virtual private network (VPN) Public Switch Telephone Network (PSTN), Wireless network with interfaces such at SMS, WAP, etc. Customers 115 may be computers executing appropriate software (not shown) for accessing the central billing server 110. In an illustrative embodiment, the billing software 200 presents billing information via the World Wide Web. In such embodiments, customers 115 execute appropriate software for accessing web pages, such as conventional web browsers. However, in alternate embodiments, customers 115 may include custom software for accessing billing software 200. As such, the description of customers 115 accessing central billing server 110 via the World Wide Web should be understood as exemplary only.

Also connected to central billing server 110 may be a network 105B that may interconnect the central billing server 110 with one or more channels. Channels may represent entities that utilize the billing software 200 overlaid with additional functionality. For example, a channel may be a bank or financial institution, thereby enabling customers 115 of the channel to process payments for bills and providing payment processing capabilities to its customers through proprietary or open payment networks such as Automated Clearing House (ACH) or credit card merchant processing. Similarly, a channel may offer its billers connection to an APPN such as Fiserv® or other aggregator presentment and payment networks enabling a biller to publish bills in APPN to be viewed by the billers customers. Further, the APPN can allow biller customers to make a payment through single or multiple APPN sites providing the capability of the billing software 200 to receive payments from the APPN. Such payments can be consolidated through such networks and further consolidated by the billing software 200, thereby providing a single payment reconciliation system for a biller.

Further embodiments include that the self-provisioning platform interfaces to ACH/credit card gateways and other networks that are particular to specific channel thereby utilizing the channel's specific payment/routing networks such as their own Automated Clearing House (ACH) systems and Credit Card merchant acquirer.

It should be noted that network 105A and 105B may be different and/or the same networks. Thus, both networks 105A/B may include the Internet. Alternatively, networks 105A/B, may comprise different networks. For example, network 105A may comprise the Internet while network 105B comprises a dedicated local area network among channels 120 and the central billing server 110. Further, networks 105A/B may be the PSTN as well as wireless networks including cellular or WiFi networks supporting mobile and SMS applications.

B. Billing Software

Figure 2A:
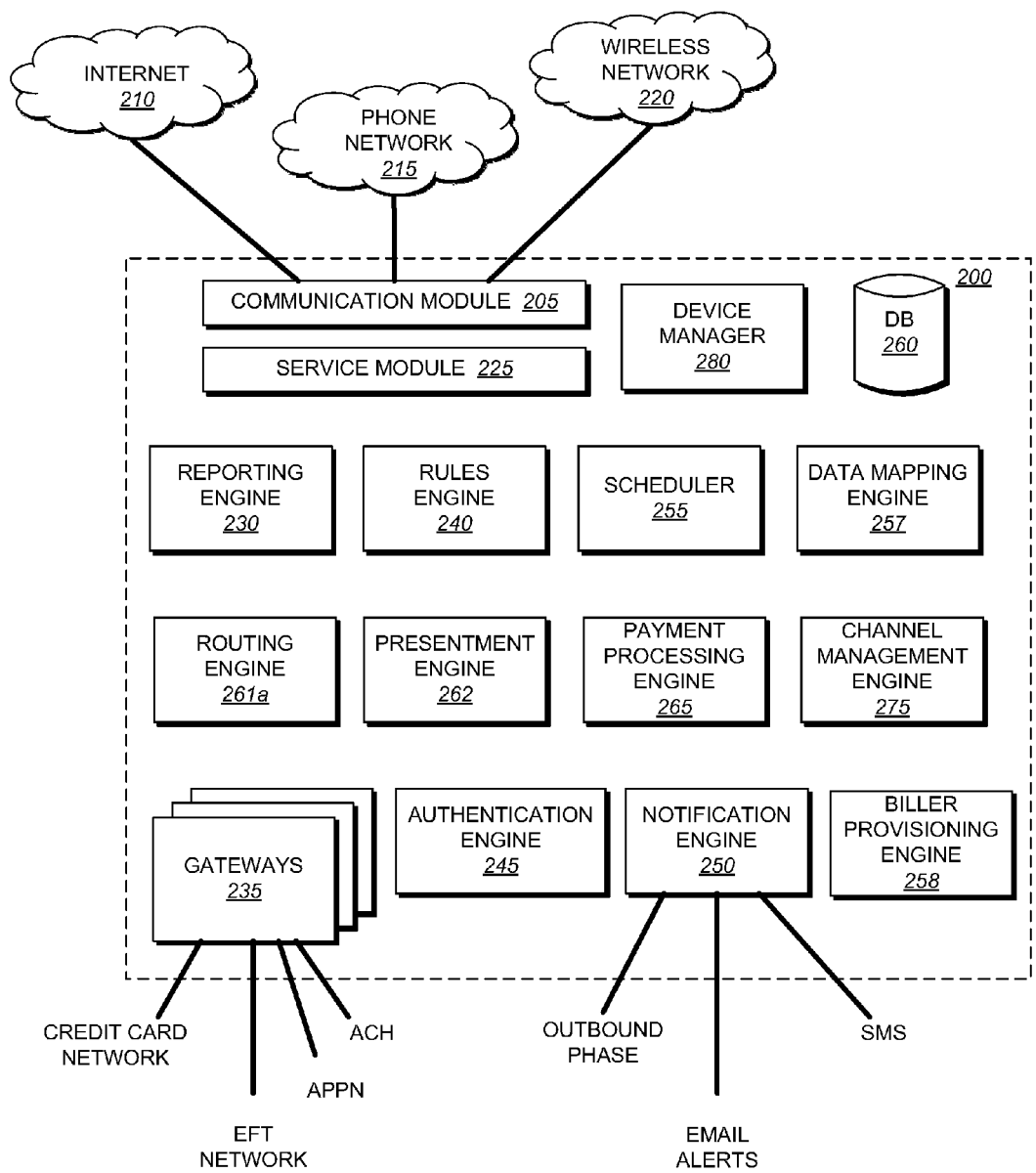
FIGS. 2A-B are schematic block diagrams of an exemplary billing software system in accordance with an illustrative embodiment of the present disclosure.

FIG. 2A is a schematic block diagram of an exemplary billing software 200 in accordance with an illustrative embodiment of the present disclosure. Illustratively, the billing software 200 implements a self or automated provisioning bill presentment and payment system that may be an aspect of the present disclosure. The software 200 illustratively includes a communication module 205, a service module 225, a reporting engine module 230, one or more gateway modules 235, a rules engine module 240, an authentication engine 245, a scheduler 255, a notification engine module 250 and a database 260. It should be noted that while the present disclosure is described in terms of billing software 200 being comprised of a plurality of modules, a person of ordinary skill in the art will appreciate that the present disclosure may be implemented using other software architectural features including, e.g., utilizing a monolithic software architecture that is not modular in nature. As such, the description of a modular billing software 200 should be taken as exemplary.

The communication module 205 provides an interface to various networks including, e.g., the Internet 210, a phone network 215, such as the publicly switched telephone network (PSTN), and/or wireless networks 220. Thus the communication module 205 enables billing software 202 to communicate over the various communication pathways. For example, the wireless network 220 may enable mobile devices to access the billing software 200, whereas the phone network 215 may enable either landline telephone systems and/or cellular telephone systems to be operatively interconnected with the billing software 200 using Interactive Voice Response (IVR) or voiceXML (VXML systems among others The service module 225 illustratively implements a number of billing services, as described further below. The reporting engine 230 operates in conjunction with the rules engine 240 and a scheduler 255 to implement the various services of the service module 225. For example, the reporting engine 230 may enable users and/or administrators of the billing software 200 to generate reports of payments made and received, outstanding invoices, etc. The scheduler 255 manages scheduled payments that may be or configured by a user, such as those described below with reference to FIGS. 17A-B

The reporting engine 230 provides reporting capabilities to biller administrators and payers of the billing software 200. Furthermore, the reporting engine can be customized by the administrator to reformat reporting output into a format readable by the biller's accounts receivable system. For example, if the biller's accounts receivable system requires data to be formatted in fixed width, the reporting engine 230 output can be configured to output its data in a fixed width format compatible with the biller's accounts receivable system.

One or more gateways 235 may provide network interfaces to payment networks including, for example credit card networks, the electronic funds transfer (EFT) network, and/or the Automated Clearing House (ACH). These gateway modules enable the billing software 200 to interconnect with various payment services for implementing payment functionality, i.e., to enable the billing software to initiate monetary transfers or credits from the payment options associated with a particular user. Gateways can connect to proprietary payment processing networks of a channel such as ACH, and merchant acquirers. The gateways module also allows an administrator to configure the biller's merchant account data for each payment service enabled for the biller. For example, the administrator would configure bank account information for an ACH gateway, credit card merchant account information for a credit card gateway, etc.

The authentication engine module 245 authenticates the payer and may operate in conjunction with external databases which may include credit agencies for verification and authentication of users. The notification engine 250 may be configured by an administrator or the payer to send notification messages via, for example an outbound phone call, an e-mail alert and/or a short message service (SMS) message in response to certain operations occurring. For example, the notification engine 250 may configured to send an SMS message in response to certain invoices being paid and/or the receipt of any payments over a predefined value. Further, the notification engine 250 enables the billing software 200 to alert the user remotely that certain operations, e.g. scheduled payments, new bills arriving in the billing software 200, etc., have been performed.

The data mapping engine 257 is used by an administrator to map their accounts receivable data, e.g. bill account and bill data, to the data required by the billing software 200. For example, a biller's accounts receivable system might output, e.g., a file containing customer account and bill data in CSV file format. The data mapping engine 257 enables the administrator to upload that CSV file and map each data element in the CSV file to the appropriate required data, e.g., billing account number, bill number, customer name, etc., within the billing software system 200.

The biller provisioning engine 258 is utilized by the billing software to promote a biller from the test environment to the production environment. The biller provisioning engine 258 packages biller data and configuration that exists in the test environment and deploys the data and configuration to the production environment without impacting customers using the system.

The database 260 is utilized by the billing software 200 to track internal data including, e.g., outstanding invoices, payments made and/or credited, and/or scheduled payments to be made. The database 260 may be implemented using conventional SQL database schemas. However, it should be noted that in alternate embodiments other known database or in memory schema may be utilized. As such, the description of an SQL database should be taken as exemplary.

In addition, the billing software 200 may include a channel management engine 275 that manages, inter alia, the configuration parameters for each channel. For example, the configuration parameters would include the parameters indicating the gateways associated with each channel. Further, the billing software 200 may include a routing engine 261a that may be configured to provide the one or more channels access to their corresponding payment gateways. The billing software 200 also includes a presentment engine 262 that presents invoices, account summaries, or other bill account information to a customer of the biller. Alternatively, payment processing engine 265 receives payment from the customer of the biller. Such payment can be received through a payment gateway, the channel payment gateway or an APPN as well as through other communication interfaces and delivery methods. The billing software 200 also includes device manager that manages the presentment and receiving payment information over the different communication systems and interfaces (e.g. web, wireless, PSTN, IVR, cellular, mobile application, SMS, WAP, mobile, or a combination thereof).

Figure 2B:
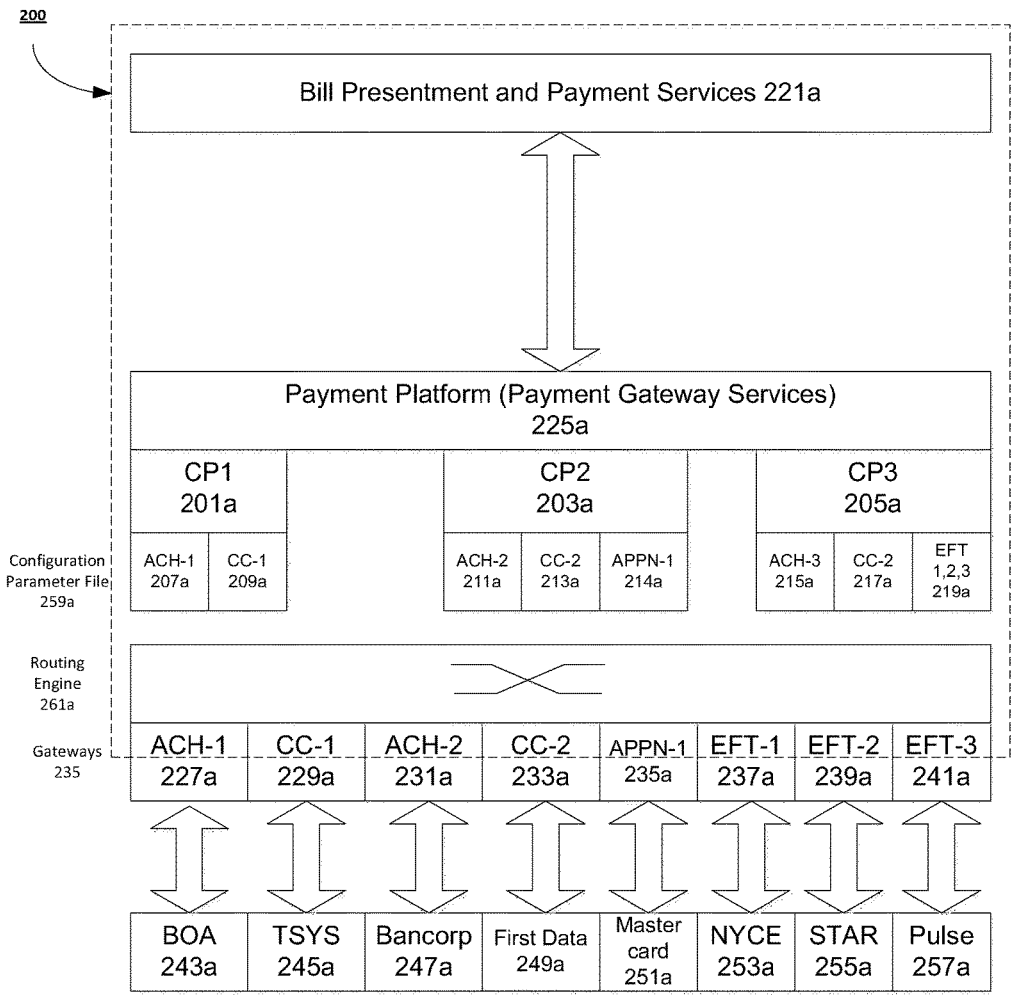

FIG. 2B is another schematic block diagram of an exemplary billing software system in accordance with an illustrative embodiment of the present disclosure. Billing software includes several components such as bill presentment and payment services 221a, direct biller services 223a, and payment platform (payment gateway services) 225a. Further, the payment platform 225a may be coupled to one or more channels CP1 201, CP2, 203a, and CP3 205a. Each channel may have one or more configuration parameters defined in software or in files 259a (207a-219a) that are coupled to gateway physical connections (235, 227a-229a) through a gateway 235 and/or routing engine 261a. Each physical connection (227a-241a) is associated with a payment gateway 235 of a bank, financial institution, or payment network (243a-257a) across a communication network.

For example, the bill presentment and payment services 221a may be provisioned to present bills and/or receive bill payments through CP 1, CP 2, or CP3 (201a-205a). Further, CP1 can receive payments through payment gateway ACH-1 207a or CC-1 (credit card payment gateway) 209a, CP2 can receive payments through payment gateway ACH-2 211a or CC-2 213a, and CP3 can receive payments through payment gateway ACH-3 215a, CC-2 217a, or EFT-1,2,3 219a. The payment platform 225a may have the capability to access several payment gateways (227a-241a). Based on the configuration parameter file 259a applied to billing software 200, the routing engine 261a is configured to provide the channels (201a-205a) access to their corresponding payment gateway (227a-241a). In some embodiments, two channels (203a and 205a) may be configured to share a payment gateway CC-2 (213a and 217a). Further embodiments allow the billing software to be configured with additional channels having one or more payment gateways as well as reconfiguring existing channels to have different payment gateways.

C. Self or Automated Provisioning

The present disclosure provides a system and method for self or automated provisioning bill presentment and payment. Billing software executing on a central billing server enables billers, business organizations that desire to send bills to other businesses or consumer customers, to self provision an automated bill presentment and payment system, such as a website, for presenting invoices and/or collecting payments. By self provisioning it is meant to include, but not limit that the system may be configured by the user without need for custom programming and/or minimal software development. The operator which may be a biller, a channel or a third party service provider, configures the billing software by selecting a billing model and setting options as to the way in which bills are uploaded to the billing system, billing data is mapped into the system, data is collected from the system and payers may provide payments using the system. Further, the billing software enables a biller to configure the look and feel of the website to enable/create customized appearances. Once the look and feel is configured, a test payment site may be implemented via the billing software to enable test payments to be made to, e.g., provide proof of concept functionality. Once the test site has been verified, the system may be activated and may go live with real bill presentment and payment to customers of the biller.

The billing software enables direct customer access via, e.g., a webpage over the World Wide Web (WWW) using the Internet as a transport medium or through various other media or interfaces such as the PSTN or wireless networks supporting cellular, mobile and SMS applications.

Further, the billing software may enable use of APPN networks, such as the Master Card RPPS. FIS®, or Fiserv® bill aggregation and or payment services, Such an embodiment enables the biller using billing software 200 to publish bills on a single or multiple APPNs. Further, payments may be collected from remote bill aggregator sites such as bank through APPN and posted in the appropriate financial accounts of a biller through the billing software 200. Reports reflect when and where the payment was collected may be provided to the biller through billing software 200. This enables a single report to be generated for the biller for payments collected through its software and or APPN's Once configured, the billing software presents the bill presentment and payment website to users and provides functionality for operatively managing bill payment and presentment. Should any upgrade or modification to the billing and/or payment website be made, the billing software dynamically manages the upgrade transition so that it is transparent to payers utilizing the system. More generally, the present disclosure permits easy iterative modifications to a billing site or telephone call flows. For example, a site may be initially deployed as a bill presentment only site. At a later point in time, the site may be re-designed as a bill presentment and payment site and re-deployed.

Figure 3:
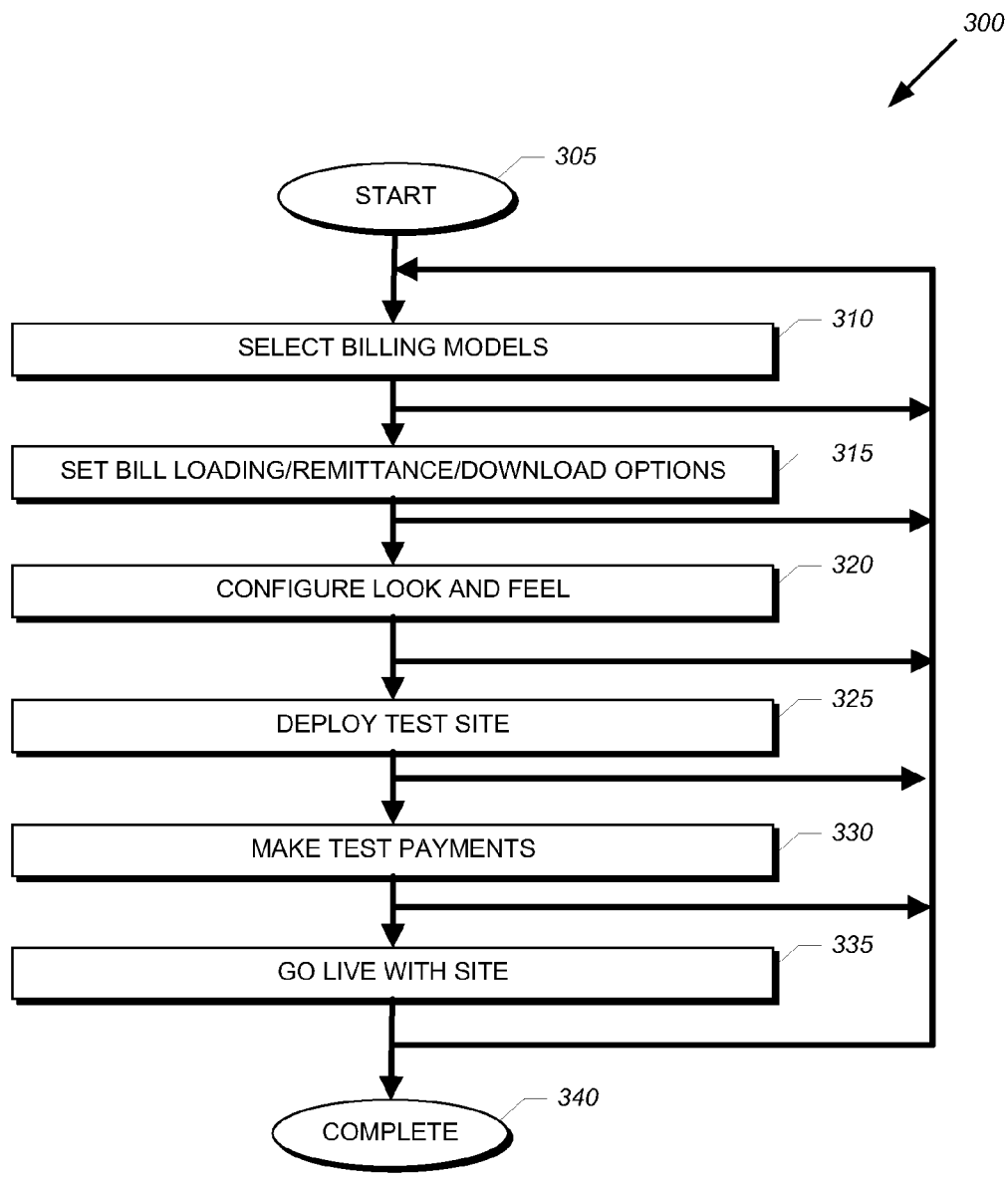
FIG. 3 is a flowchart detailing the steps of a procedure for self provisioning a bill presentment and payment system in accordance with an illustrative embodiment of the present disclosure.

FIG. 3 is a flowchart detailing steps of a procedure 300 for utilizing the billing software 200 of the present disclosure. A person of ordinary skill in the art would understand that the steps shown in FIG. 3 are exemplary and could include additional or alternative steps as well as the order of implementing the steps may be altered or modified. The procedure 300 begins in step 305 and continues to step 310 where the administrator selects the appropriate billing models. Billing models may include, e.g., payment without presentment, payment with short presentment, payment with varying stages of login credentials, voice-based payment, etc.

In accordance with the illustrative embodiment a variety of billing models may be utilized. For example, one billing model is payment without presentment that allows a payer to make a payment without having been enrolled as a repeat payer or supplying account credentials. In such a payment without presentment model, the payer provides basic account and payment information. Another billing model is payment with short presentment that presents a summary bill information and enables electronic payment capture. In such a payment with short presentment model, customers that have established payment profiles may have alerts pushed out and predefined payment instructions performed as bill information is uploaded. A third billing model is payment with no login credentials that may be utilized when integrating with a biller's existing web presence via a single sign-on interface. In a single sign on environment, the payer may logon to a partner site and may have their credentials passed through the billing software to the central billing server. Another billing model is to utilize payment with login credentials which requires a username and password scheme for account identification to complete payment processing. When a payer accesses the central billing server and billing software executing therein, a user ID and password is entered to obtain summary bill information and the biller's account information. A biller may choose to pre-enroll their entire client base by providing account number and last name as the initial user ID and password to access their account information. The billing software 200 may also configure an IVR system that corresponds to the billing model defined in the billing software. Any of the above models may be deliverable via a voice option to enable phone-based payment using either a dual tone modulated frequency (DTMF) and/or speech recognition.

Similarly, a text based presentment and or payment model may be implemented where payment is originated and completed by a mobile phone-based text messaging such as an SMS text message. Similarly a WAP based presentment and payment may be configured by the billing software where the bills are presented to a WAP enabled mobile device and payment of the transactions is completed by that device. Similarly a mobile application based presentment and payment may be configured where bills are presented and or paid by a mobile phone-based application that has been downloaded, or installed at the time of device manufacture. Another billing model may be full presentment only (with no payment capability) where presentment of the bill is provided but payment is rendered via other channels. This may be utilized when, for example, the billing software 200 is utilized for bill presentment to enable payers to pay via, e.g., a check mailed into a processing facility.

In another embodiment, biller software 200 may present a bill or invoice via a text message or SMS to a mobile device. Further, the text message or SMS may also have a hyperlink that can be selected to view summary or detail bills though a WAP browser or a mobile application resident on the device. In addition, the text message or SMS would allow the customer to pay the presented bill using a short code replying to the text message or providing an instruction or special phrase such as "pay" and a short code. Alternative embodiments may include the billing software presenting invoices or bills and receiving payment through a WAP browser resident on the phone. Other embodiments may include the billing software presenting invoices or bills and/or receiving payment through a mobile application downloaded to the mobile device or installed on the device at the time of its manufacturing.

Once appropriate billing models have been selected, the administrator sets the bill loading, remittance, and download options in step 315. Bill loading options and downloading options include, e.g., how bills may be entered into the billing software 200 or how payment information is retrieved from billing software 200. In an illustrative embodiment, the data mapping engine 257 may be utilized to reformat the biller's accounting system output data into a format acceptable for use with the billing software 200. In alternative embodiments, the billing software 200 may accept a plurality of different formats of input data, e.g., QuickBooks, Peachtree, etc. Download options may include, for example, physically mailing data to a particular address or to permit a biller to receive payment information via, e.g., file transfer protocol (FTP). In addition, the output data from the reporting engine 230 can be reformatted into a format that can be readily imported into the biller's accounts receivable system. Remittance options that may be set include types of payment which may be utilized. For example, a biller may only authorize credit card payments, electronic fund transfers, electronic checks through the automated clearing house system, etc. As certain payment systems include fees, such as fees associated with the use of credit cards, a biller may decide not to permit certain payment options depending on business models and/or business judgment.

The look and feel may then be configured in step 320. The look and feel configuration may be as simple as the company logos or as extensive as custom Cascading Style Sheets (CSS) to match the look and feel of the biller's web site, customization of all text in the bill presentment and payment site, audio files to be integrated into a voice response system, etc. In accordance with the illustrative embodiment of the present disclosure, the billing software 200 utilizes a common core of functionality; however, the look and feel may be configured to enable a degree of customization by users of the billing software. Once the look and feel has been configured, a test site may be deployed in step 325. The test site is illustratively deployed with a few sample accounts so that test payments can be made to ensure that data is being collected properly or that bill payment and presentment information is being performed properly. Making test payments and verifying such functionality is implemented in step 330. Once the functionality has been verified and no errors have been detected, the payment site may then be brought online in step 335 via the biller provisioning engine 258 so that it may be accessible by payers to make live payments. In accordance with an embodiment of the present disclosure should a change in the design occur, for example, additional billing models be added or modified, etc., the billing software may transition users logging in to the billing software over to the new model so that transitions occur transparently to a payer and without interruption of currently processing of transactions currently in progress. The procedure then completes in step 340.

It should be noted that in alternative embodiments, the procedure 300 may loop back to step 310 after the completion of any step to enable modifications and/or iterative changes to be made to a site. Thus, the present disclosure enables a user to create new workflows based on selections in each of the steps and to iterate development of the workflows.

The following description describes FIGS. 4A-17B are example embodiments of the disclosure and not limiting in scope. For example, persons of ordinary skill in the art would understand that different work flows may be incorporated in other embodiments.

Figure 4A:
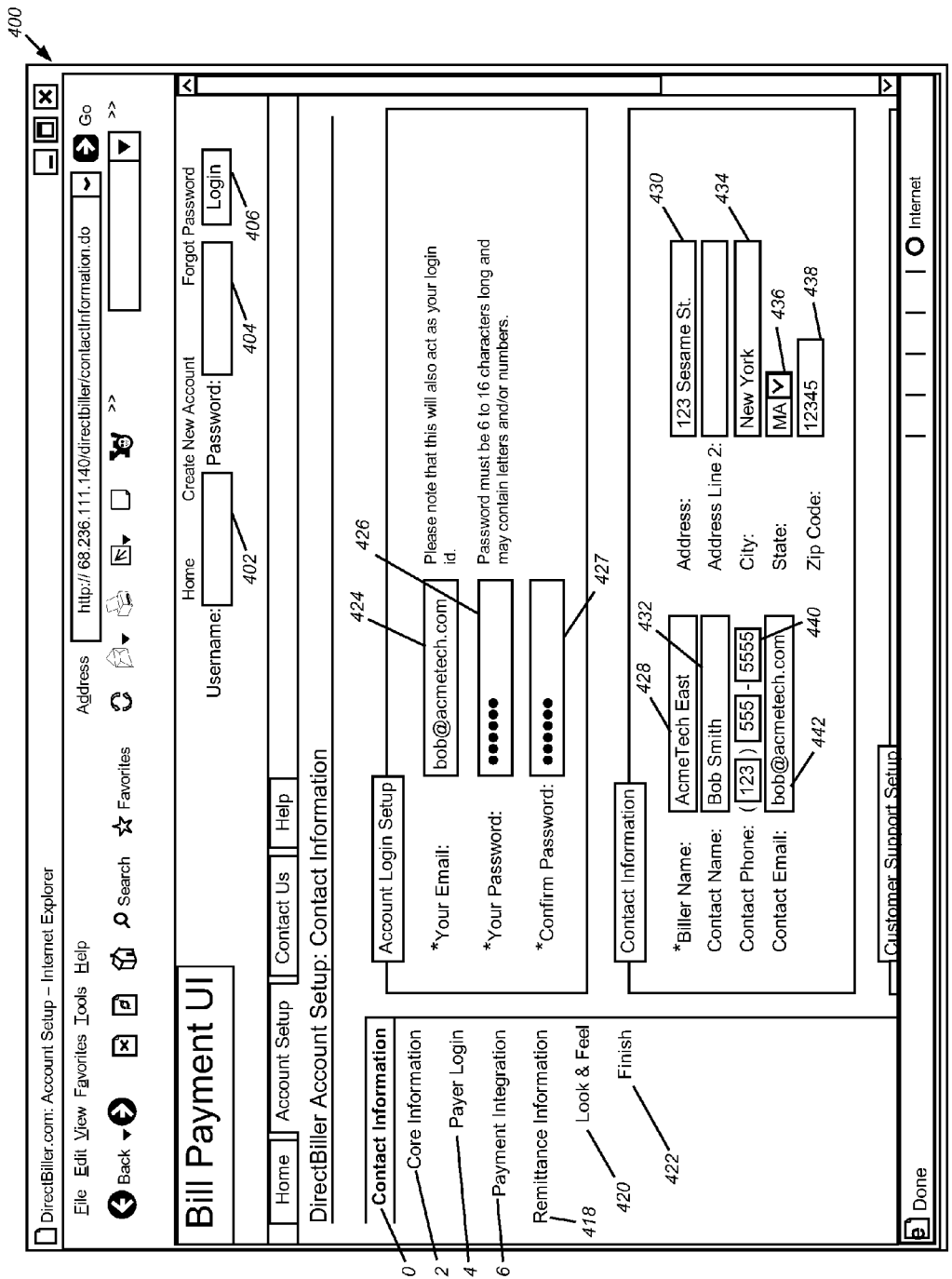
Figure 4B:
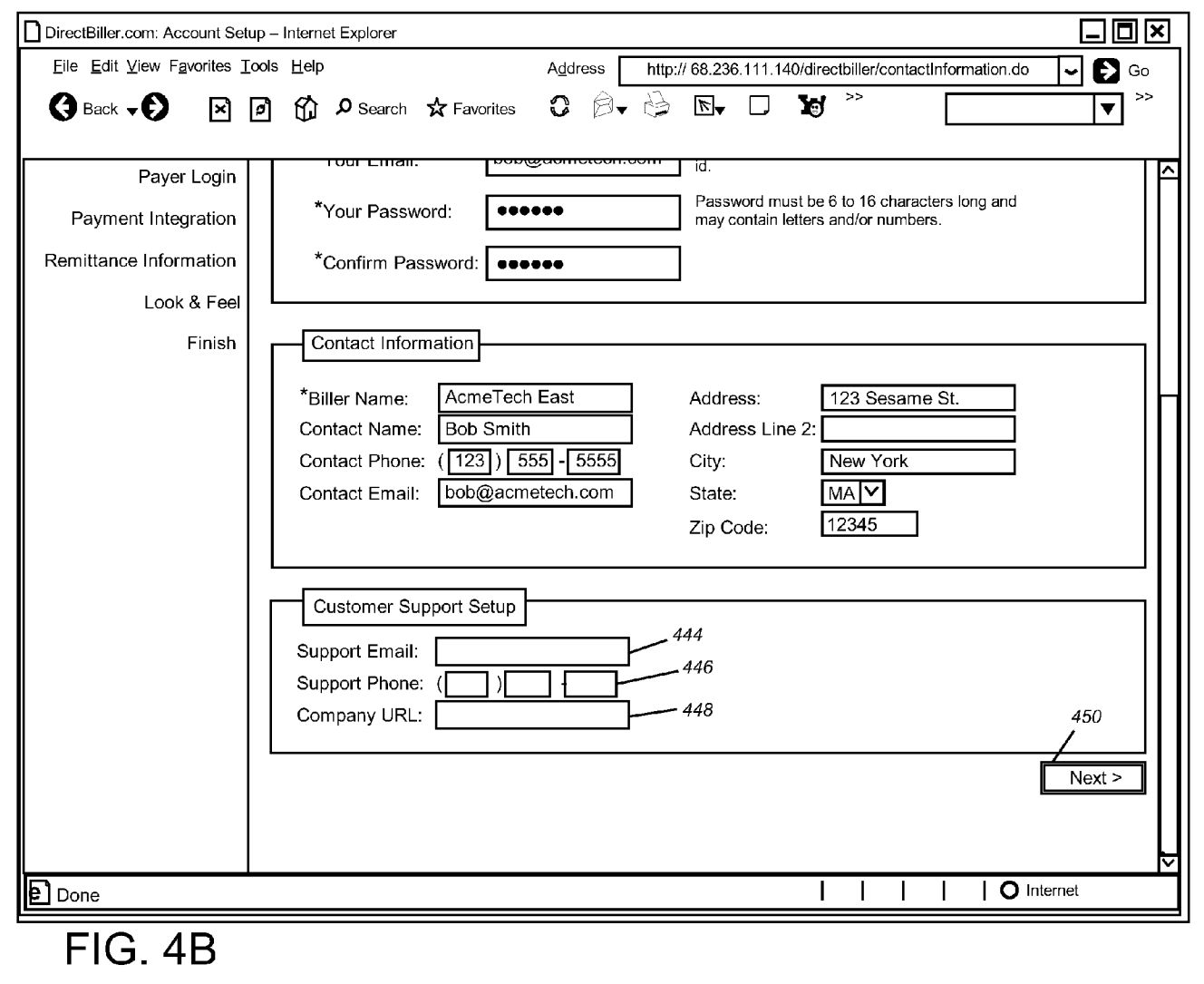

FIGS. 4A-4B are screenshots of a GUI window 400 illustrating entry of contact information in accordance with an illustrative embodiment of the present disclosure. The GUI window 400 includes a username field 402 and password field 404 along with a login button 406. Thus, an administrator or user may enter an appropriate username and password in fields 402, 404 before clicking button 406 finish a logon procedure. Also provided in window 400 are set of tabs including, an account setup tab 408. As can be seen from window 400, the account setup tab 408 has been selected. Along the left of the window 400 are a collection of the steps during the account setup procedure including that for contact information 410, core information 412, payer login 414, payment integration 416, remittance information 418, look and feel 420 and finished 422. The window 400 also includes fields for a biller to enter an e-mail address 424, a password 426 and a confirmation password 427. Illustratively, the e-mail 424 and password 426 are utilized in the username and password fields 402, 404 for logging into the billing software 200. Further, in FIG. 4B, clicking button 450 allows the user to proceed to a next web screenshot.

Figure 5B:
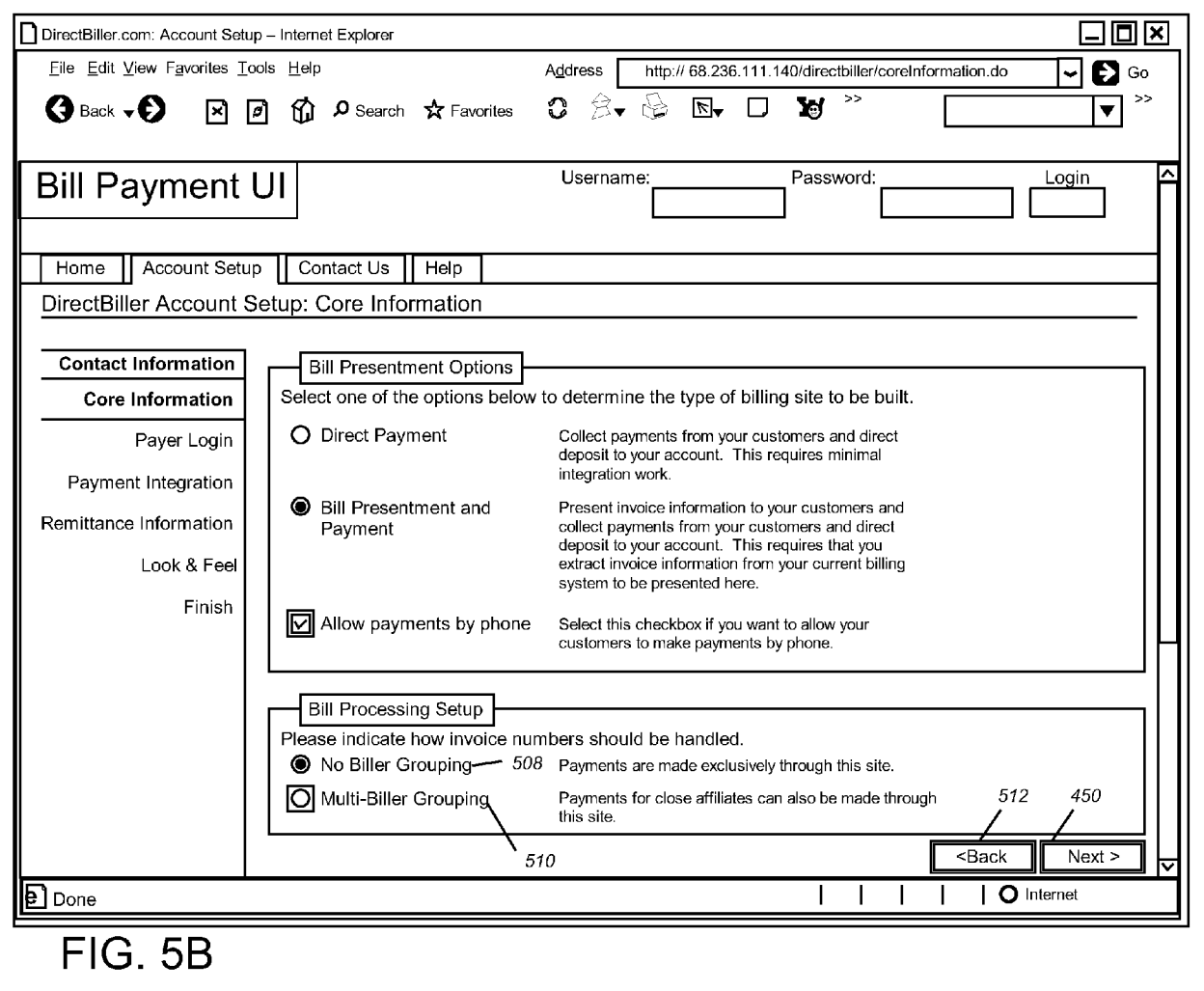
Figure 5C:
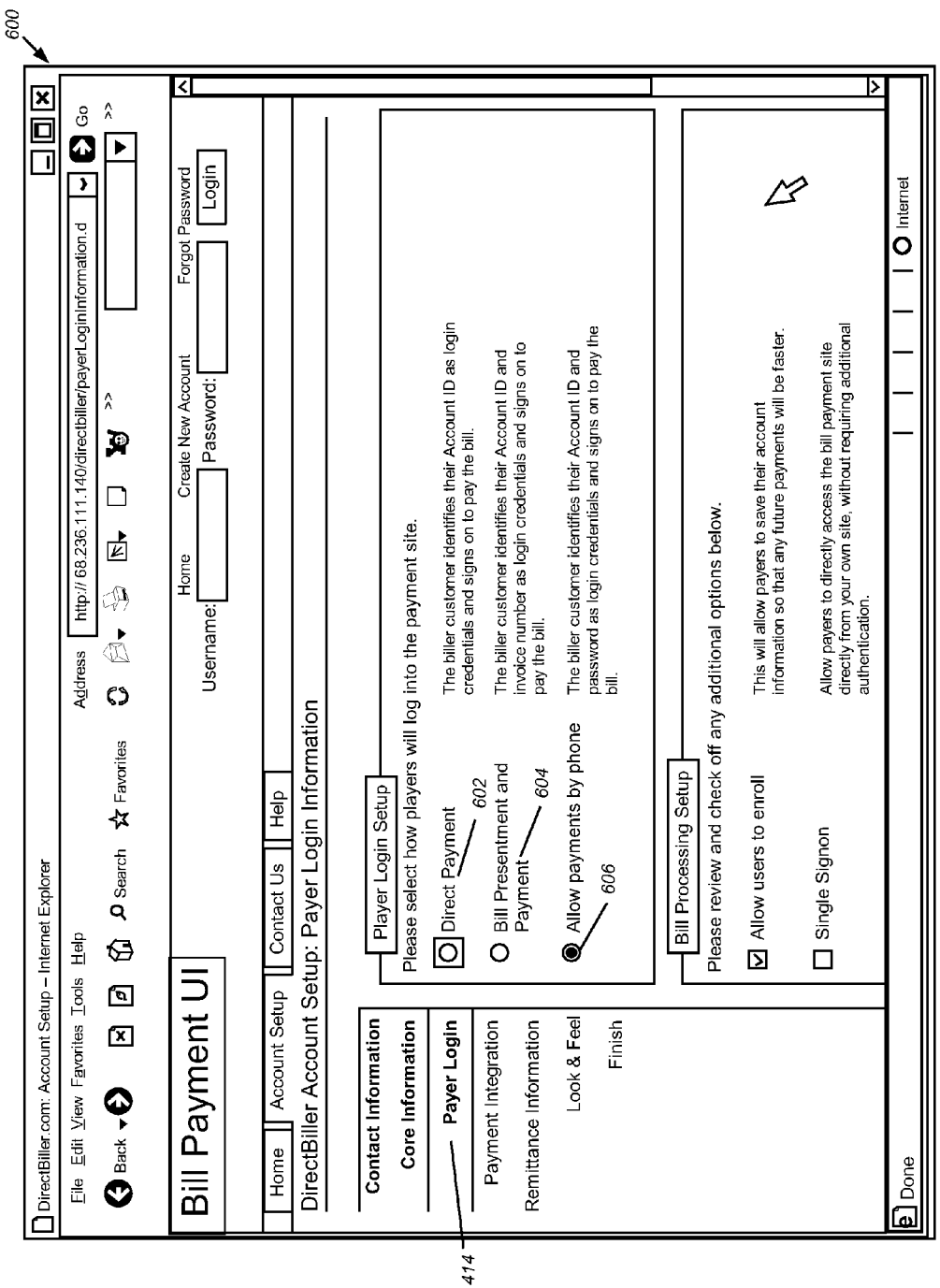

FIGS. 5A-5C are screenshots of a GUI window 500 illustrating self provisioning by configuring bill presentment and payment consolidation options. The window 500 includes options for the biller to select the type of billing website to be designed namely a direct payment website, or a bill presentment and payment website 504. The window 500 includes an option 506 to permit payments be made by phone. Further, the window 500 includes options that may be configured to allow multi-biller grouping 510 or no grouping 508 (See FIG. 5B). The window 400 also includes buttons to enable the administrator to move back 512 or to the next window 450 (See FIG. 4B).

FIG. 5C is screenshot of GUI window 600 illustrating self provisioning and payer login information in accordance with an illustrative embodiment of the present disclosure. The window 600 includes an option that may be configured as to how a payer logs onto the site including options that causes a payer to login using an account ID only 602, an account ID and an invoice number 604 and/or an account ID and a password 606. Further, the window 600 includes options that may allow users to enroll 608 and/or utilize a single sign-on feature 610. For example by selecting option 602 a payer only needs to identify himself using an account identifier. For example, an account identifier may be included on a paper bill that was mailed or e-mailed to a payer. Similarly, option 604 may require that a payer a login to the system using an account identifier and an invoice number as a password. This requires that each payer has an invoice number, such as that obtainable from a paper bill. Option 606 may require that any payer log into the system utilizing both an account ID and password. Option 606 thus would enable a payer to logon and pay any of a plurality of different bills currently outstanding.

Figure 6:
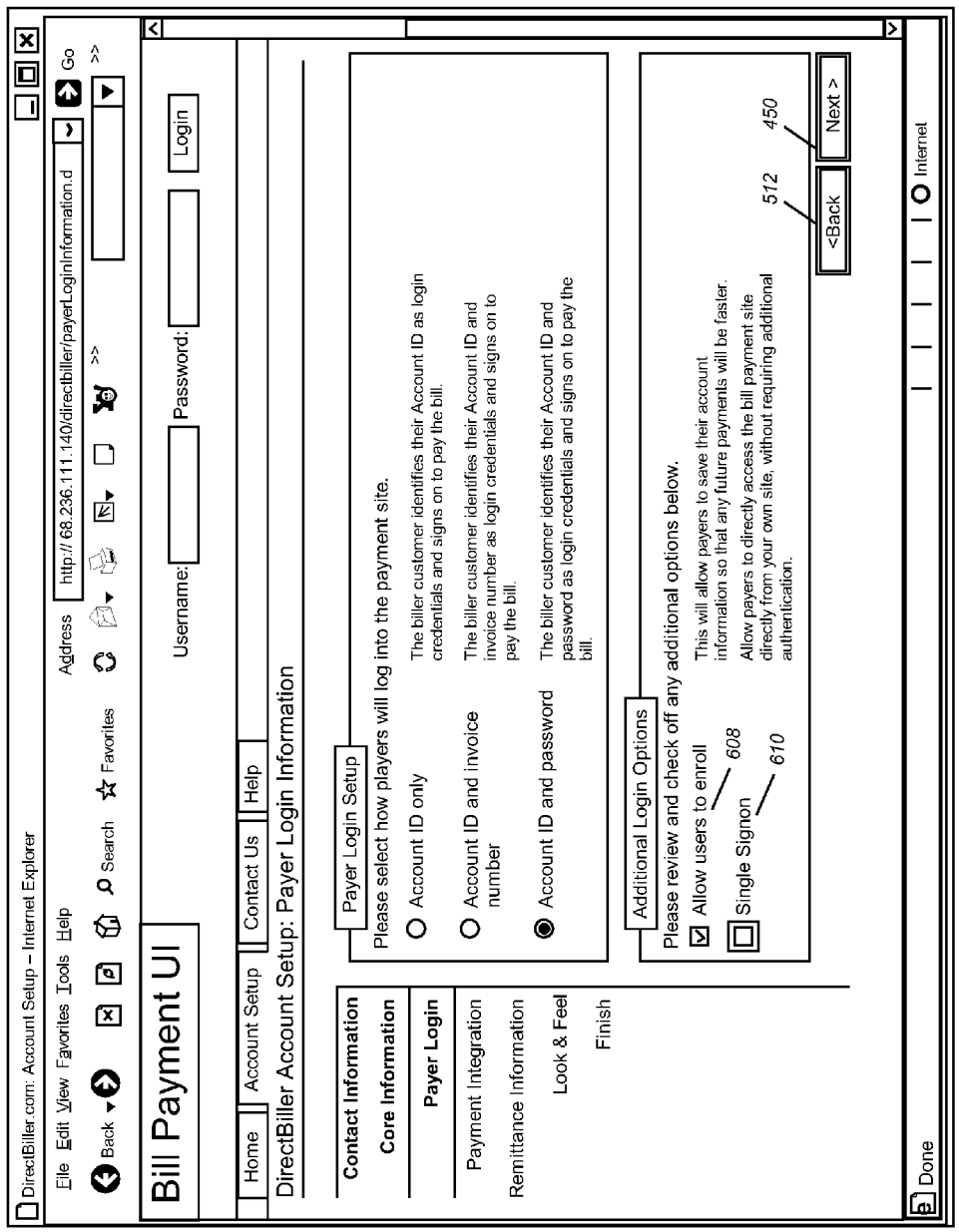
FIG. 6 is a screenshot of a GUI window illustrating self provisioning of payer login options in accordance with an illustrative embodiment of the present disclosure.

Referring to FIG. 6, option 608, if selected, enables a user, such as a payer to enroll with the billing software so that information is saved to expedite future payments. For example, a payer may save credit card numbers, checking account numbers, etc. so that such data does not need to be reentered when making future payments. A single sign-on option 610 permits payers to directly access the bill payment site directly from a partner biller's site without requiring additional authentication. For example, if a payer is required to login to a biller's site, such credentials from the biller's site may be passed to the bill payment system.

Figure 7:
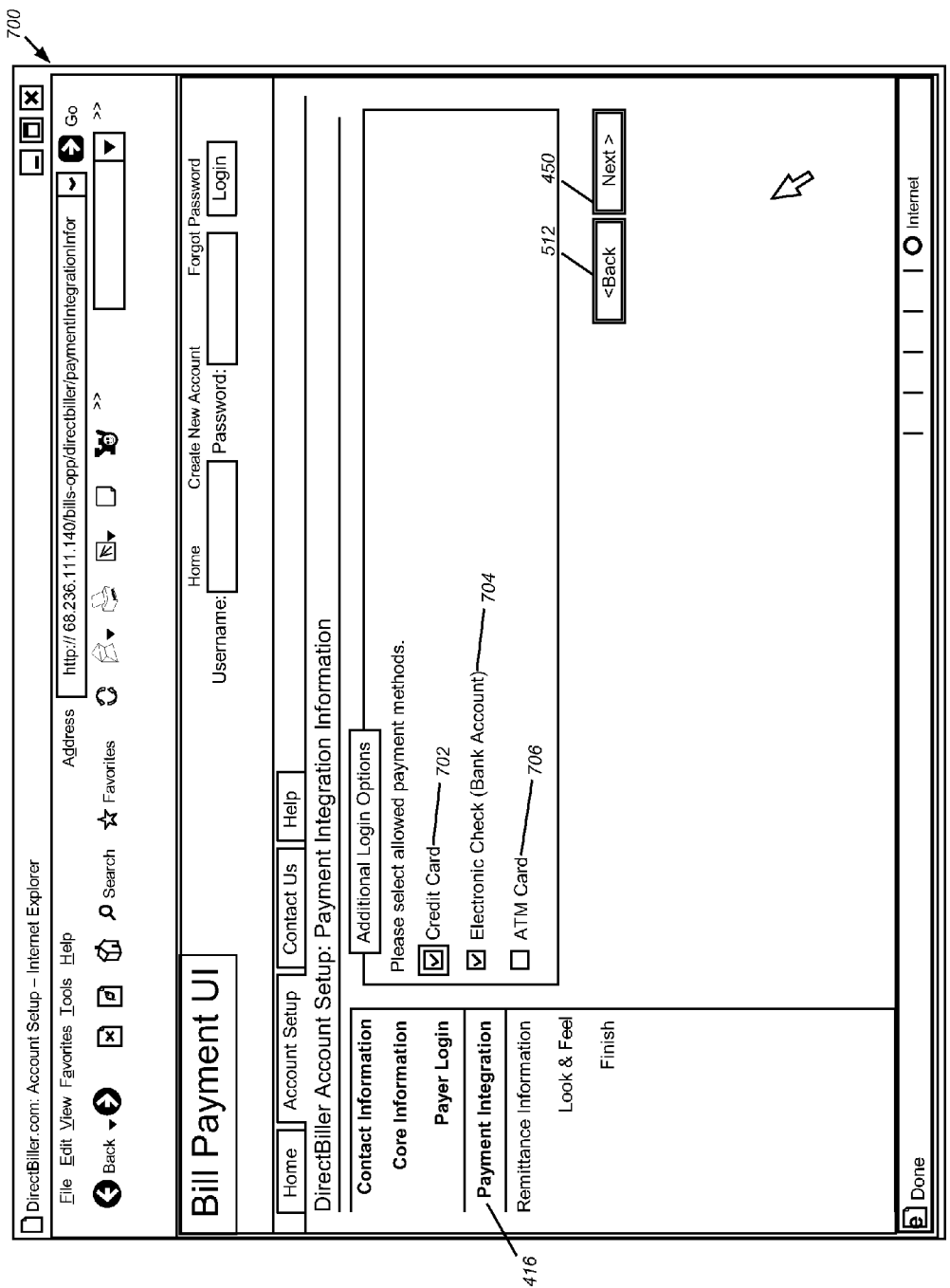
FIG. 7 is a screenshot of a GUI window illustrating self provisioning of payment integration and customer payment options in accordance with an illustrative embodiment of the present disclosure.

FIG. 7 is a screenshot of a GUI window 700 illustrating payment integration and customer payment options in accordance with an illustrative embodiment of the present disclosure. The window 700 includes options that may be configured by the biller to enable payment by credit card 702, electronic check 704 and/or automated teller machine card 706. Thus, for example, payers may be limited to pay by a credit card if option 702 selected. Similarly, by selecting option 704, electronic checks may be utilized as a payment method. ATM cards may be utilized if option 706 is selected. It should be noted that in alternate embodiments additional and/or differing payment options may be utilized. As such, the example shown in FIG. 7 should be taken as exemplary only. For example, in alternate embodiment different forms of credit cards may be allowed and/or disallowed on an individual basis. Thus, for example, a biller may accept payment from American Express but not payment from Visa or vice versa. Such flexibility enables a biller to avoid a certain fees associated with credit cards if the biller does not desire to pay such fees.

Figure 8:
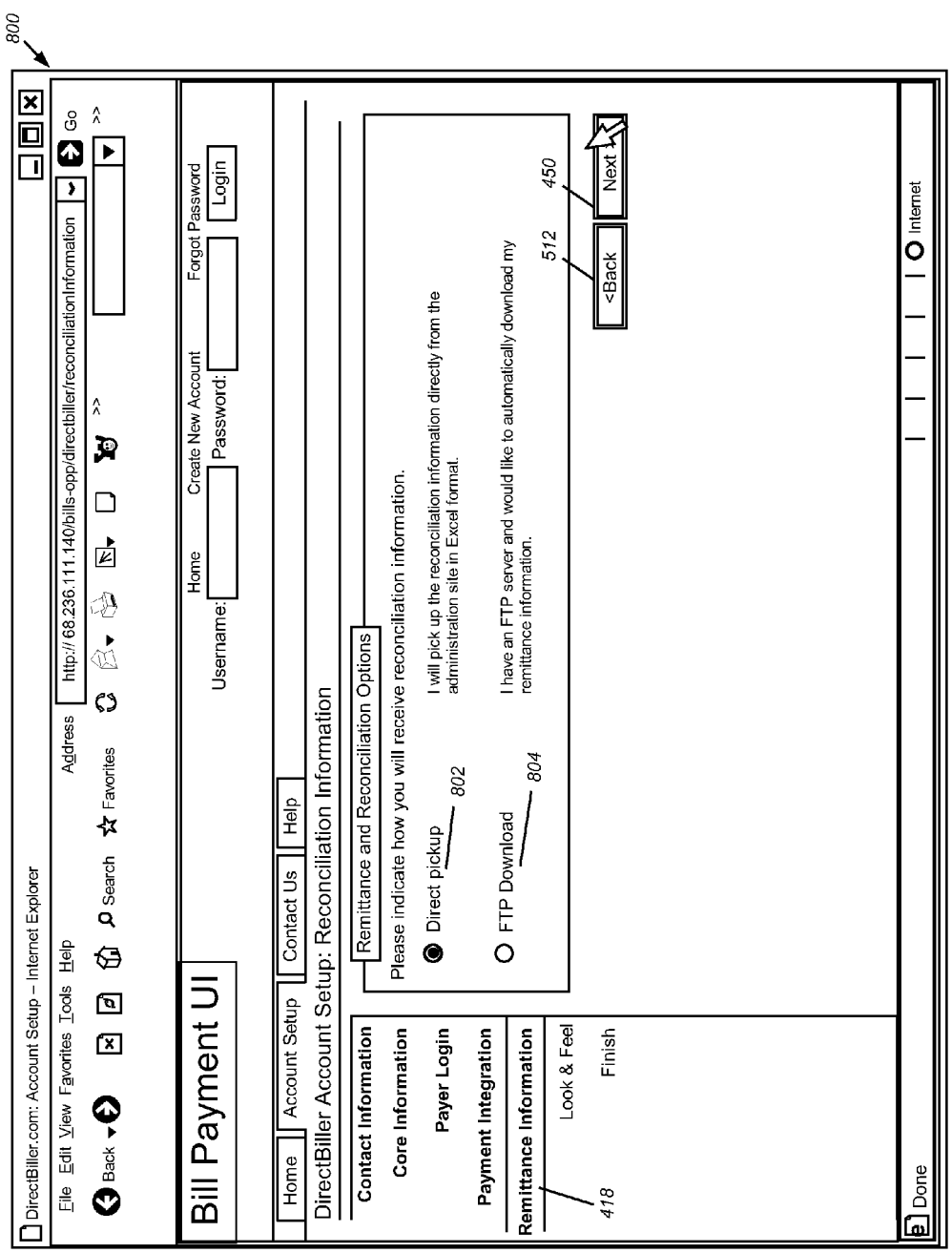
FIG. 8 is a screenshot of a GUI window illustrating self provisioning of remittance and reconciliation options in accordance with an illustrative embodiment of the present disclosure.

FIG. 8 is a screenshot of a GUI window 800 illustrating provisioning of remittance and reconciliation information in accordance with an illustrative embodiment of the present disclosure. The window 800 includes options to enable direct pickup 802 and/or FTP download 804. By selecting option 802, a biller may download the appropriate reconciliation information directly from the billing software. Illustratively, the reconciliation information is downloaded as an Excel spreadsheet; however, in alternate embodiments additional and/or differing formats may be utilized. As such, the description of the use of an Excel spreadsheet should be taken as exemplary. By selecting option 804, a biller may login and utilized the file transfer protocol to download remaining remittance information.

Figure 9B:
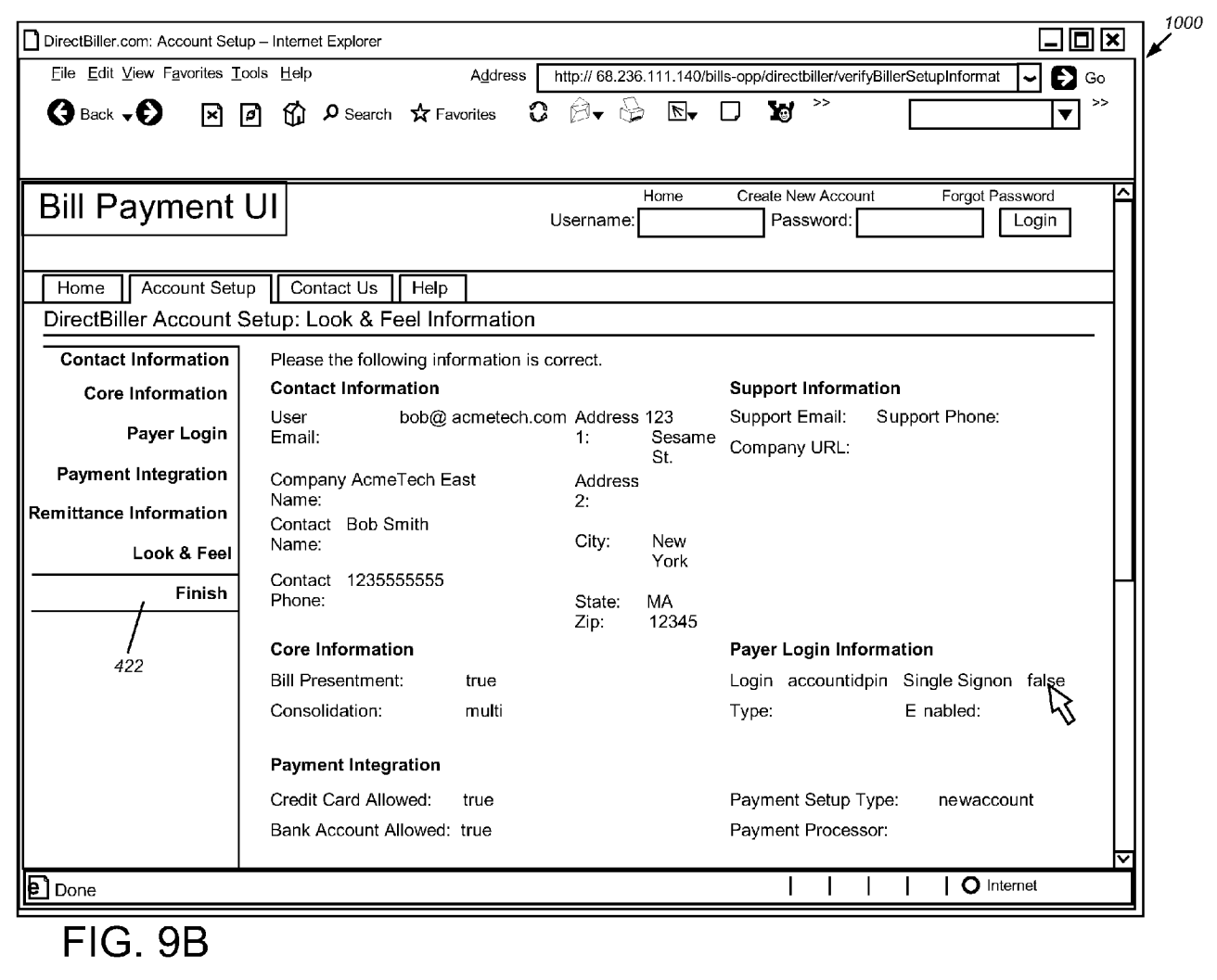

FIGS. 9A-9B are screenshots of a GUI window 900 illustrating provisioning of look and feel information in accordance with an illustrative embodiment of the present disclosure. The screen 900 includes a field 902 identifying a company logo. By entering a filename into the company logo field 902 the billing software may utilize the company logo in a various places throughout the billing presentment and payment website to enable a customized look for the site. Further, the window 900 includes a field 904 to enable a biller to enter an audio recording of the biller name. By entering a file name of an audio recording in field 904, the billing system may utilize the audio recording in, for example, voice payment systems. Thus, for example, a standard menu of payment options may be presented with the audio recording of the company name may be inserted into such playback. It should be noted that in alternate embodiments of the present disclosure additional and/or differing look and feel options may be utilized besides a company logo field 902 and/or recording field 904. Thus, the description of look and feel options described herein in reference to FIGS. 9A and 9B to be taken as exemplary only.

Figure 10:
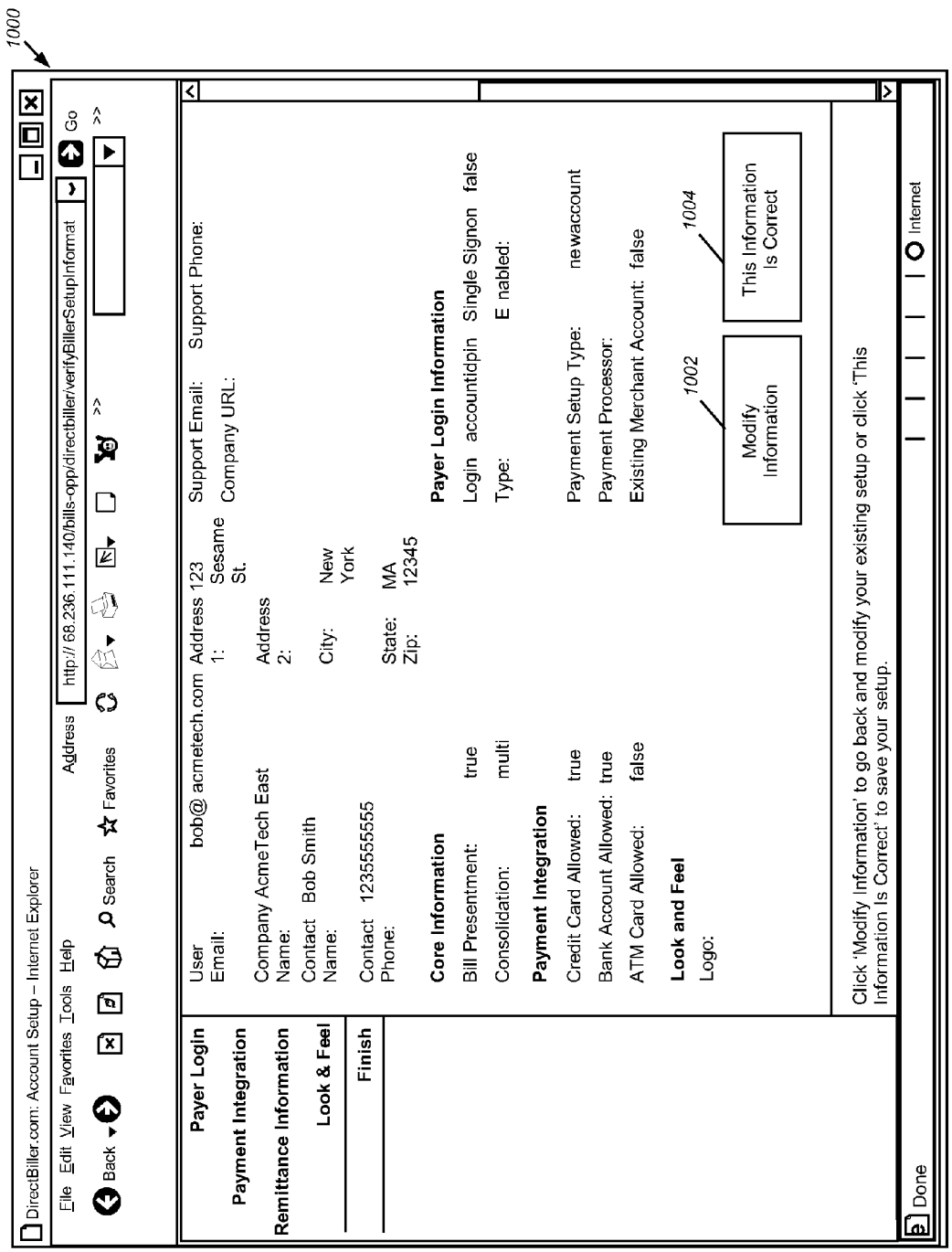
FIG. 10 is a screenshot of an a GUI window illustrating self provisioning of confirmation of set up information in accordance with an illustrative embodiment of the present disclosure.

FIG. 10 is a screenshot of a GUI window 1000 illustrating a confirmation of set up information window in accordance with an illustrative embodiment of the present disclosure. The window 1000 includes buttons to modify information 1002 and/or identify that the displayed information is correct 1004. Window 1000 illustrates examples of entered information from the self provisioning procedure. If information must be modified a user may select the modify information button 1002. However, if all information is correct, the system is ready for execution and a user may select button 1004.

D. Payment Using Self or Automated Provisioned System

Figure 11:
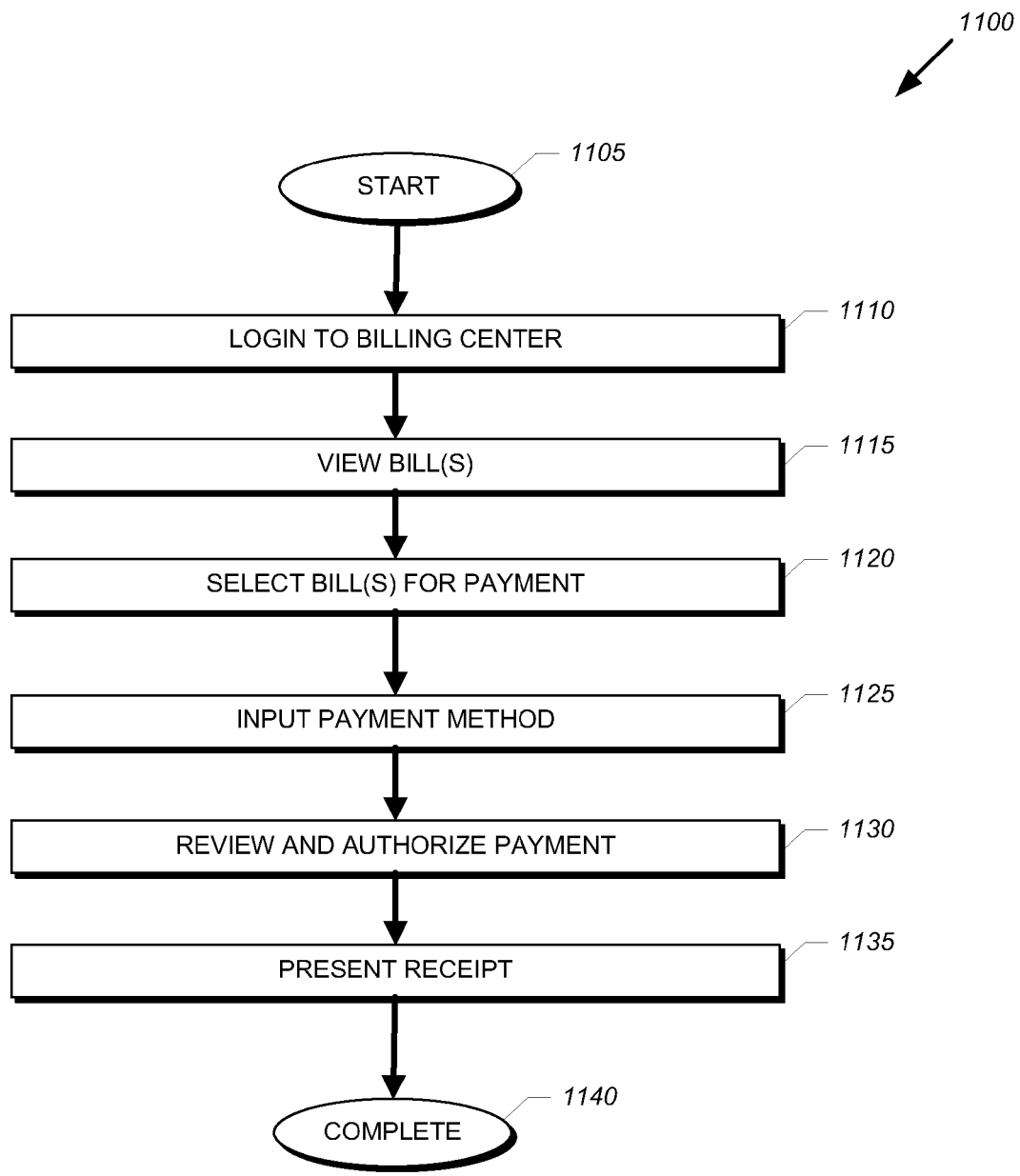
FIG. 11 is a flowchart detailing the steps of a procedure for utilizing a bill presentment and payment system in accordance with an illustrative embodiment of the present disclosure.

FIG. 11 is a flowchart detailing the steps of a procedure 1100 for utilizing the self provisioning bill presentment and payment system in accordance with an illustrative embodiment of the present disclosure. The procedure 1100 begins in step 1105 and continues to step 1110 where a payer logs into the billing server. A payer may login to the billing server utilizing a user ID and password, a user ID only, or a user ID and invoice number, depending upon the configuration made by the biller in accordance with embodiments of the present disclosure. Further, it should be noted that in alternate embodiments a payer may log into the billing server using other forms of authentication including, e.g., a single sign-on. A payer then views appropriate bills in step 1115. Such reviewing of bills is further described below in reference to FIG. 13. A user may view bills that are currently pending or to review additional details related to a paper bill that was received. Once the bills have been reviewed, the payer then selects appropriate bills for payment in step 1120. A description a selection of bills to be paid as described below in further reference to FIGS. 13 and 14. For example, a plurality of bills may be currently pending and the user may select only to pay ones that are currently due while waiting for payment of later due bills. Further, as described further below, a payer may schedule later payments, that is, a payer may schedule an automatic payment to be made on a given date, for example, a day before the due date. Thus, for example, a payer does not need to remember to login at a later date to make such a payment.

The payer then inputs an appropriate payment method in step 1125. For example, the payer may select to pay by credit card, by electronic check, automated clearing house, etc. As described above, a biller may configure the billing software to permit certain remittance forms. A payer may utilize any of the acceptable remittance forms, assuming that they have appropriate payment facilities, i.e. a valid credit card. The billing software 200 permits the payer to review and authorize payment in step 1130 before presenting a receipt in step 1135. The billing software permits the user to verify payment to ensure that, for example, appropriate amounts were entered, etc. The procedure 1100 completes in step 1140. It should be noted that procedure 1100 is exemplary only and that in alternate embodiments of the present disclosure the various steps may be performed in alternate or varying differing orders. Further, in accordance with embodiments of the present disclosure certain data may be preselected, for example a user may configure a bill payment methodology, for example a credit card so that the user does not need to select a payment methodology.

Figure 12:
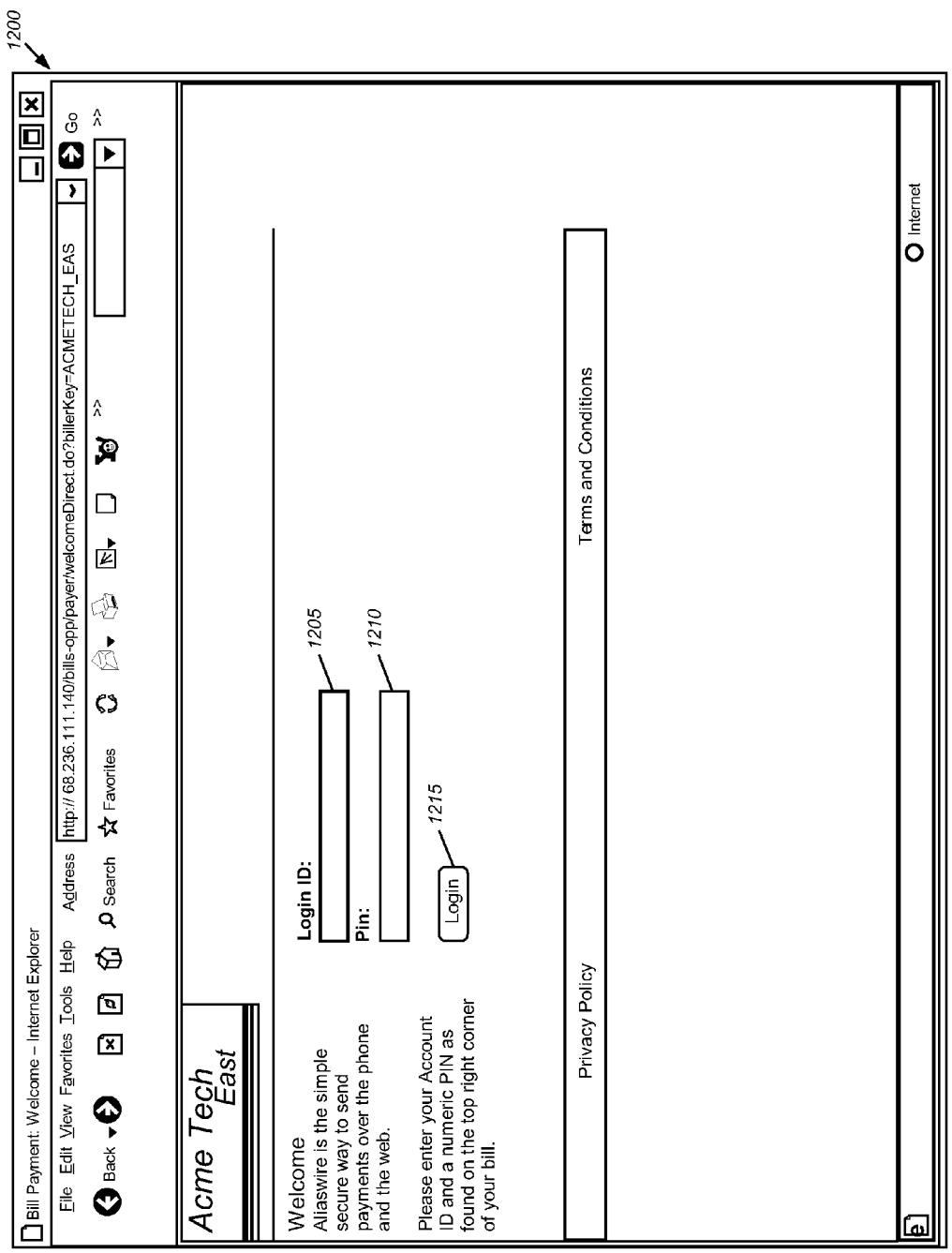
FIG. 12 is a screenshot of a GUI window illustrating a login screen to a bill presentment and payment system in accordance with an illustrative embodiment of the present disclosure.

FIG. 12 is a screenshot of the GUI window 1200 illustrating a login screen for a payer in accordance with an illustrative embodiment of the present disclosure. The window 1200 includes a field for login ID 1205 and a field for a personal identification number (or password) 1210. In accordance with embodiments of the present disclosure a user enters a login identifier in field 1205 and a password in field 1210. The user then selects a login button 1215 to be logged into the billing software. It should be noted that in alternate embodiments, login and/or password field 1205, 1210 may be optional. For example, if the system is configured to log in with just a login ID, no password field 1210 may be present. Similarly, should single sign-on functionality be activated, no login screen may be displayed if the payer has previously been authenticated.

Figure 13:
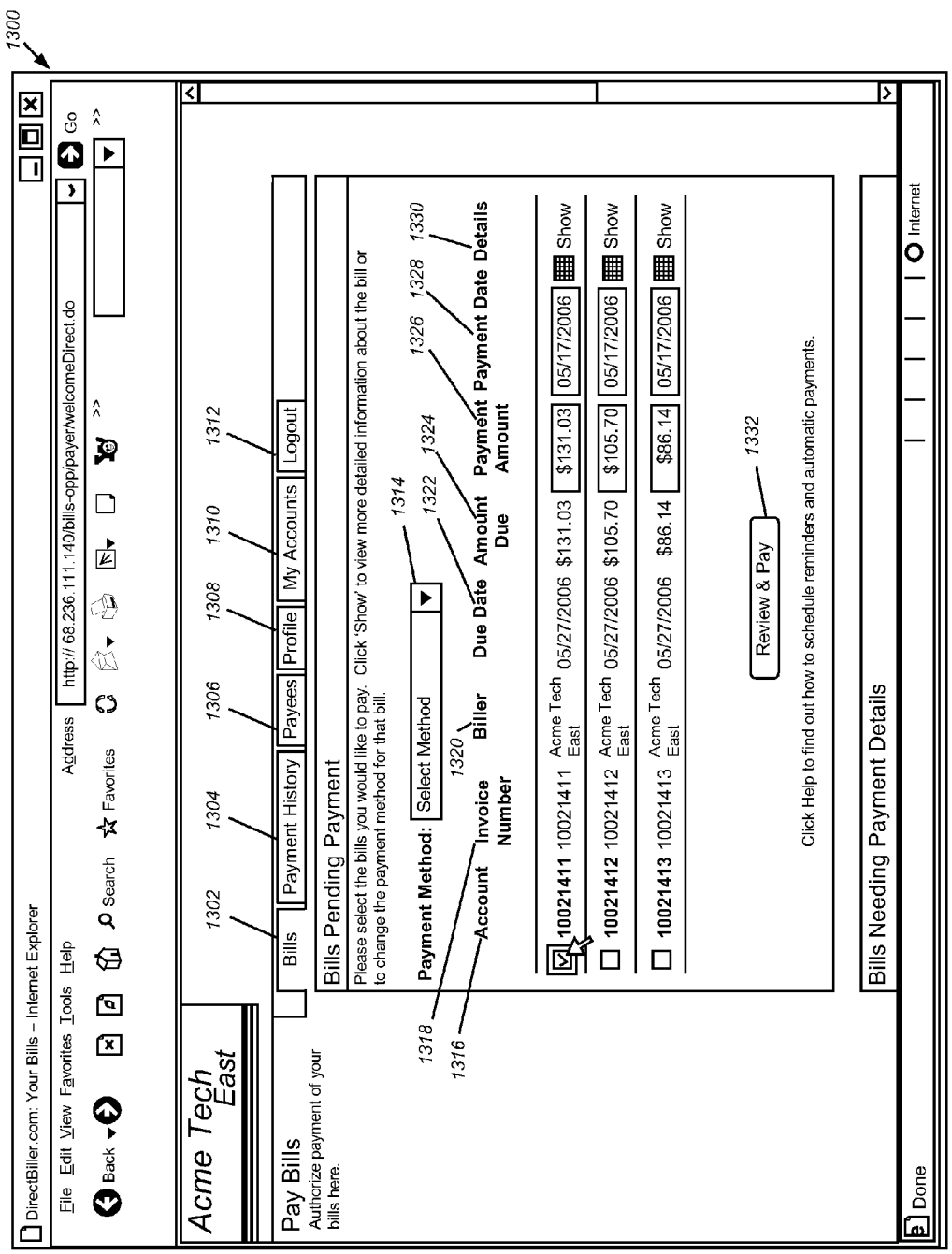
FIG. 13 is a screenshot of a GUI window illustrating a bills pending display in accordance with an illustrative embodiment of the present disclosure.

FIG. 13 is a screenshot of an exemplary GUI window 1300 illustrating payment or bills pending payment in accordance with an illustrative embodiment of the present disclosure. The window 1300 includes tabs for navigation to go to bills 1302, payment history 1304, payees 1306, profile 1308, my accounts 1310 and to logout 1312. As can be seen in window 1300 the bills tab 1302 has been selected causing the system to display bills pending payment. Illustratively, a drop-down menu 1314 for payment methods is provided 1314 that enables a payer to select a payment method to pay a particular bill. The window 1300 also includes columns displaying various information relating to bills that are pending payment including, for example, an account field 1316, an invoice field 1318, a bill field 1320, a due date field 1322, an amount due field 1324, a payment field amount 1326, a payment date field 1328 and a details field 1330. The account field 1316 identifies an account number or account name associated with the bill. The invoice number field 1318 identifies a particular invoice number with which the bill is associated. The biller field 1320 identifies the originator of the invoice. For example, in multi-divisional business enterprises there may be a plurality of separate billers associated and a single invoice. The due date field 1322 identifies the date that the bill is due. The amount due field 1324 identifies a set amount due for a particular invoice. The payment amount field 1326 enables a payer to enter a payment amount. For example, a payer may decide not to pay the entire amount due as described in field 1324 or may pay an amount greater than the amount due to generate a credit to their account. The payment date field 1328 enables the user to enter a date at which payment may be made. For example, a user may decide to make a payment a day, a week or some other predetermined time prior to the date that the bill is due. The details field 1330 provides an option to enable system to show additional details relating to a particular bill.

Further, the window 1300 includes a review and pay button 1332. Once particular data has been entered into, for example the payment amount and payment date fields 1326, 1328, a user may click the review and pay button 1332 to proceed to verify that the amounts are correct and to effectuate payment. It should be noted that the various fields and buttons shown are exemplary only and that in alternate embodiments additional and/or differing data fields may be displayed without departing from the scope of the present disclosure. As such, the description of the various fields 1316-1330 should be taken as exemplary only.

Figure 14:
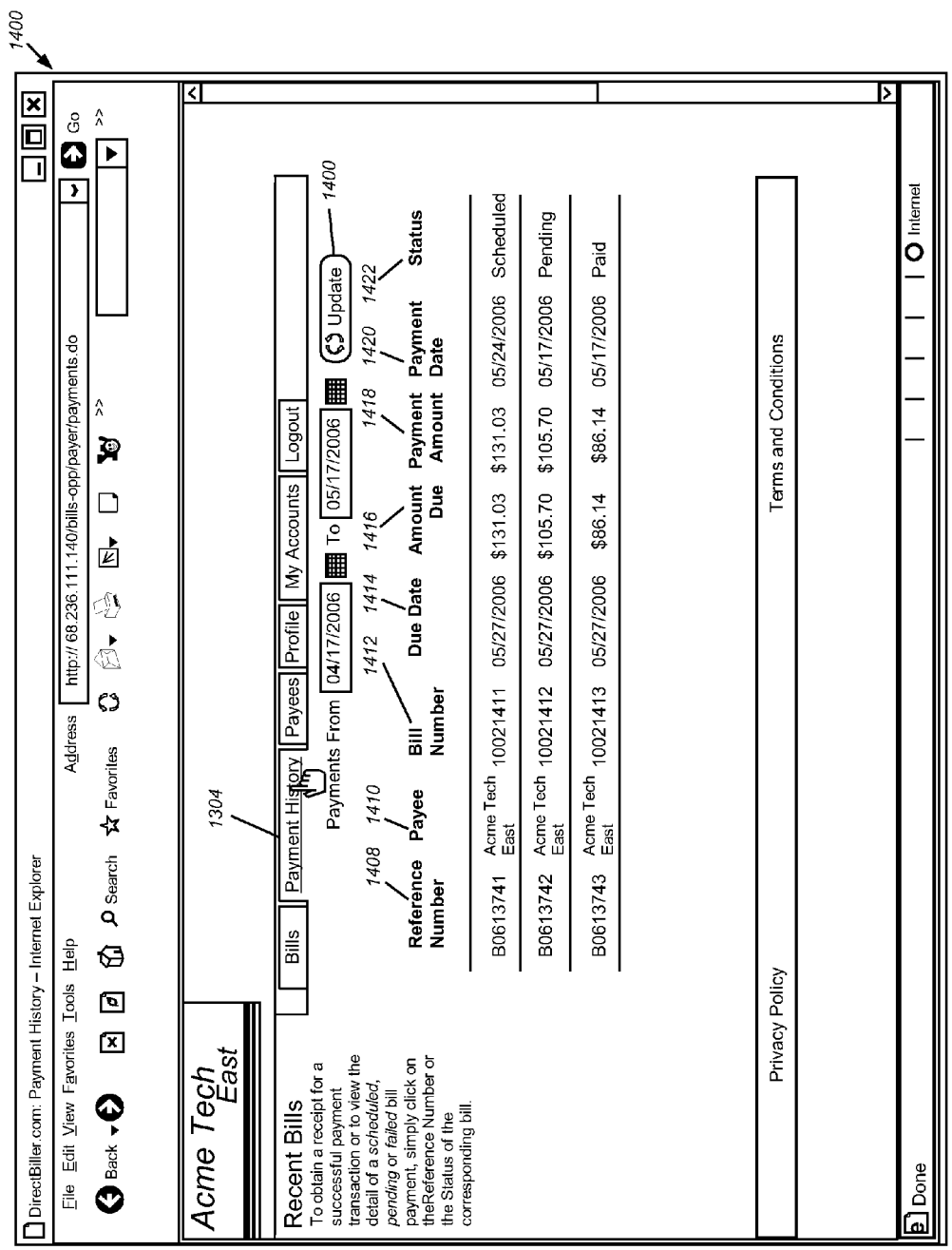
FIG. 14 is a screenshot of a GUI window illustrating a payment history in accordance with an illustrative embodiment of the present disclosure.

FIG. 14 is a screenshot of a GUI window 1400 illustrating a display when the payment history tab 1304 has been selected. A range field including a From field 1402 and To field 1404 enable a payer to select a date range to display the payment history. An update button 1406 causes the system to update the window 1400 to include all payments made within the data range of selected by fields 1402, 1404. The window 1400 includes various fields is illustrating the data relating to payments made including, for example, a reference number field 1408, a payee field 1410, a bill number field 1412, a due date field 1414, an amount due field 1416, a payment amount field 1418, a payment date field 1420 and a status field 1422.

Figure 15:
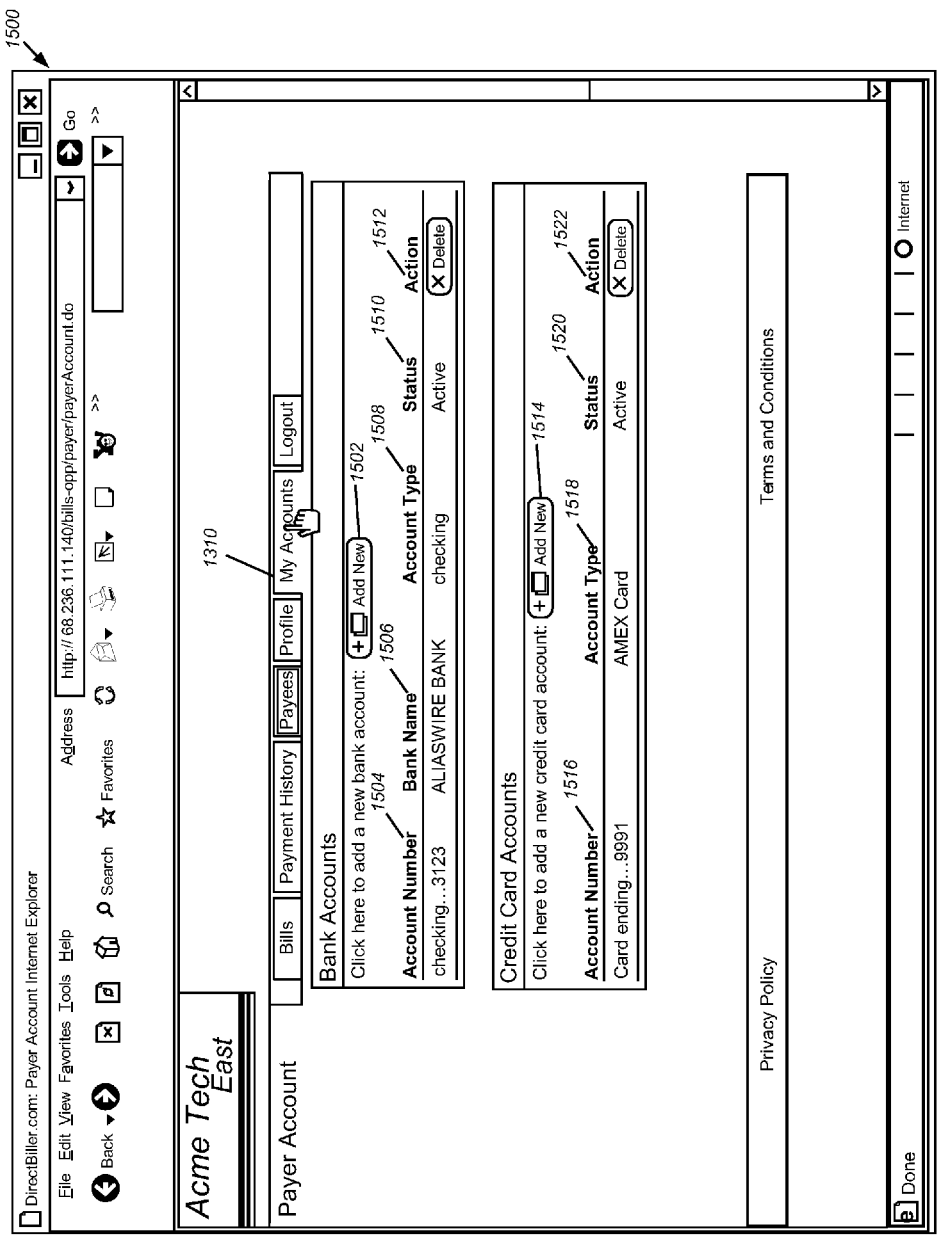
FIG. 15 is a screenshot of a GUI window illustrating account information in accordance with an illustrative embodiment of the present disclosure.

FIG. 15 is a screenshot of a GUI window 1500 illustrating a display when the my accounts tab 1310 has been selected. A button 1502 to add a new bank account is included. By clicking on the add new bank account button 1502, a user may associated new bank account with the billing software. Further, the system displays all current bank accounts associated with a particular payer. Such bank account information includes, for example, account number field 1504, a bank name field 1506, an account type field 1508, a status field 1510 and an action field 1512. The account number field 1504 identifies the checking account number associated with a particular bank account. Illustratively, for security purposes on the last two digits of the account number are displayed. The bank name field 1506 identifies the name of the bank with which the account is associated. The account type field 1508 identifies whether or the type of bank account, for example a checking account, a savings account, a money market account, etc. The status field 1510 identifies the current status of the checking account, for example, active, dormant, inactive, etc. The action field 1512 provides actions to be performed with relation to the account before deletion of the account.

Similarly, the system displays information relating to credit card accounts associated with a particular payer. The system displays a button to add a new credit card account 1514. The button to add a new credit card account 1514 operate similar to button 1502 to enable a user to associate a new credit card with the bill payment system. Further, the window 1500 includes information relating to currently associated credit card accounts including, for example, account number field 1516, an account type field 1518, a status field 1520, and an action field 1522. The account number field 1516 identifies the credit card account number. Again, for security purposes typically only the last few account numbers are shown. The account type field 1518 identifies a type of credit card, for example an American Express card, a Visa card, a MasterCard, etc. The status field 1520 identifies the current status of the credit card. The action field 152 to permit certain actions, such as deleting the credit card to be performed.

Figure 16:
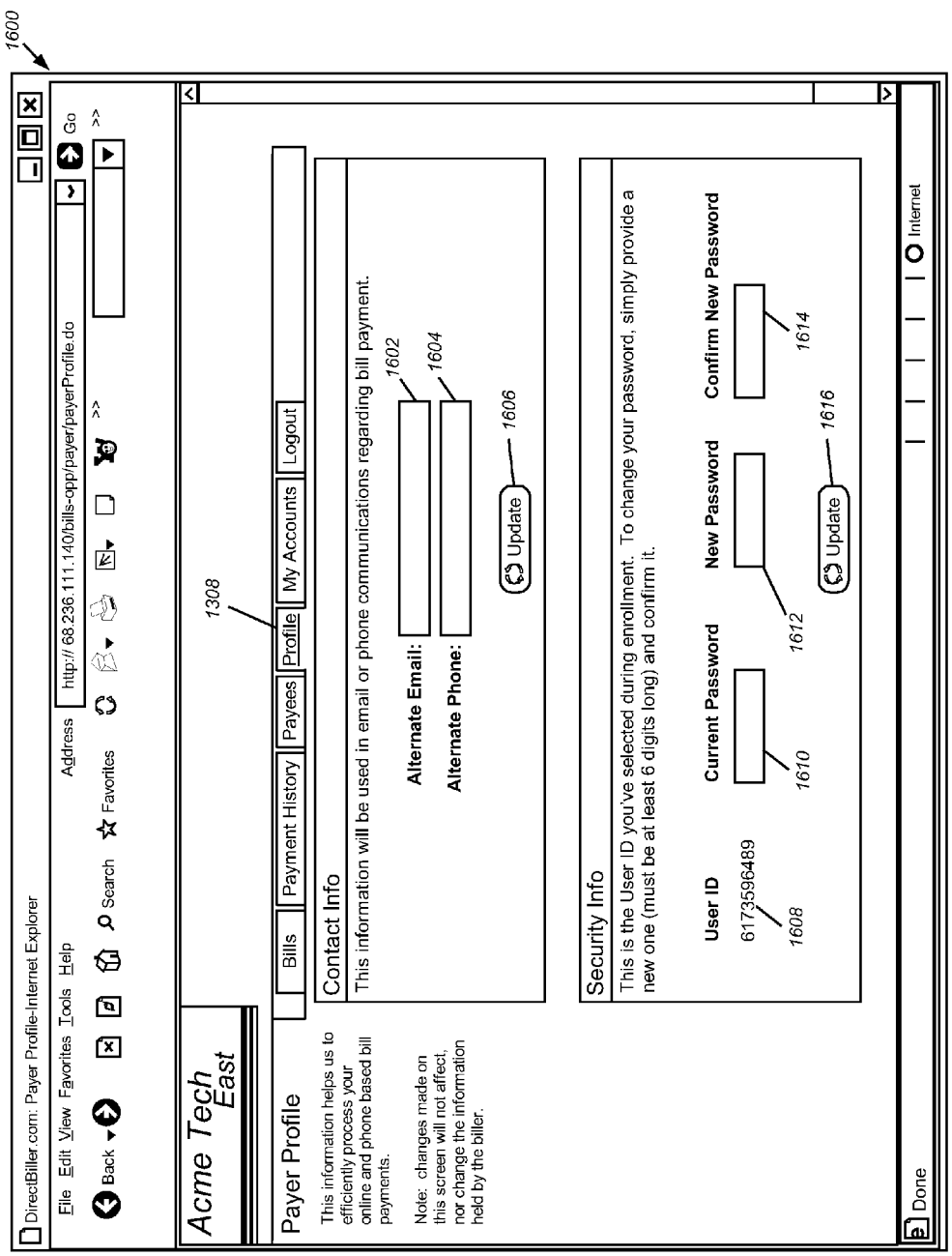
FIG. 16 is a screenshot of a GUI window illustrating a profile page in accordance with an illustrative embodiment of the present disclosure.

FIG. 16 is a screenshot of a GUI window 1600 illustrating the selection of the profile tab 1308 in accordance with an illustrative embodiment of the present disclosure. Window 1600 includes alternate e-mail field 1602 and alternate phone field 1604. An update button 1606 is provided to update information after being entered into fields 1602, 1604. Further, security information may be displayed including, for example, a user ID 1608. Fields are also provided to enter a current password 1610, a new password 1612 and to confirm the new password 1614. An update field 1616 is updated when a payer's password to be newly entered password in new password field 1612.

Figure 17A:
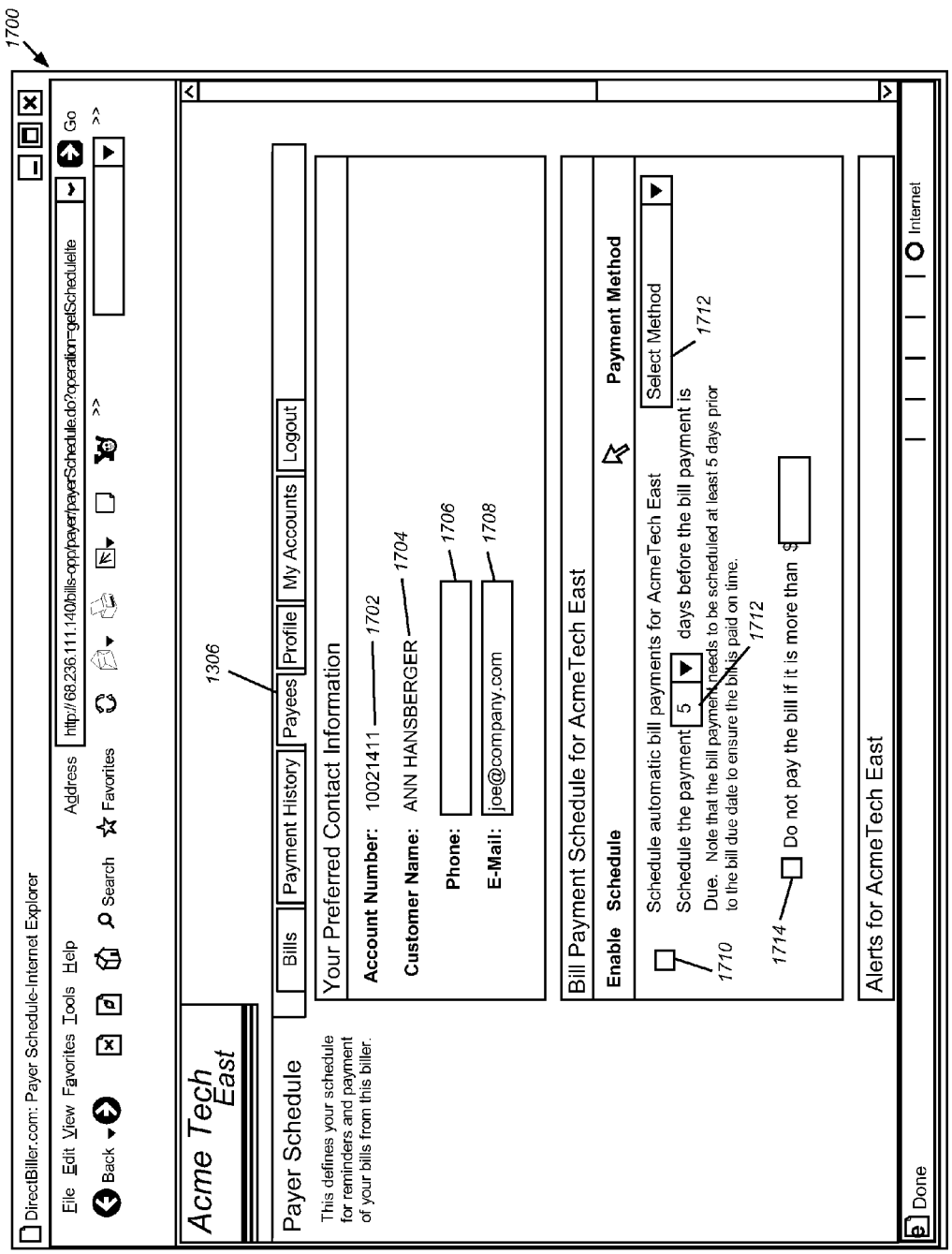

FIGS. 17A-17B are screenshots of an exemplary GUI window 1700 illustrating selection of a payee tab 1306 in accordance with an illustrative embodiment of the present disclosure. The window 1700 includes a display of the account number 1702 and customer name 1704. The window further includes a phone number field 1706 and an email field 1708. Such fields 1706, 1708 enable a user to enter their preferred contact information. The window 1700 also includes options to enable 1710 automatic bill payments to a particular biller. For example, a user may selection click box 1710 to make automatic payments using the method selected in menu 1712. Such payments would be made X days prior to their due date, where X is selected from menu 1712. A user may also select box 1714 to not make automatic payments if the amount is over a predefined amount. Window 1700 also provides for configuring alerts for certain billers. Such alerts include an enable field 1716, an alert field 1718 and an alert method field 1720 (See FIG. 17B).

The foregoing description has been directed to specific embodiments of this disclosure. It will be apparent, however, that other variations and modifications may be made to the described embodiments, with the attainment of some or all of their advantages. For instance, it is expressly contemplated that the procedures, processes, layers and/or modules described herein may be implemented in hardware, software, embodied as a computer-readable medium having executable program instructions, firmware, or a combination thereof. Further, any embodiment disclosed or claims illustrating steps and/or component of aspects of the disclosure can be ordered in any manner according to ways known to persons of ordinary skill in the art. Accordingly this description is to be taken only by way of example and not to otherwise limit the scope of the invention. Therefore, it is the object of the appended claims to cover all such variations and modifications as come within the true spirit and scope of the invention.

Note that the functional blocks, methods, devices and systems described in the present disclosure may be integrated or divided into different combination of systems, devices, and functional blocks as would be known to those skilled in the art.

In general, it should be understood that the circuits described herein may be implemented in hardware using integrated circuit development technologies, or yet via some other methods, or the combination of hardware and software objects that could be ordered, parameterized, and connected in a software environment to implement different functions described herein. For example, the present application may be implemented using a general purpose or dedicated processor running a software application through volatile or non-volatile memory. Also, the hardware objects could communicate using electrical signals, with states of the signals representing different data.

It should be further understood that this and other arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions, or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., " a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., " a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for provisioning bill presentment and payment using an electronic bill presentment and payment (EBPP) system, the method comprising:
   (a) configuring, by a biller provisioning engine module, the EBPP system, the EBPP system includes:
      (i) a computer server having:
         (1) one or more processors,
         (2) a routing engine module coupled to one or more payment processing gateways and one or more communication interfaces,
         (3) one or more storage devices coupled to the one or more processors, the one or more storage devices storing a database, wherein one or more bill presentment and payment capabilities are stored in the database, and
         (4) one or more modules, including the biller provisioning engine module, a data mapping module, and a services module, implemented by the one or more processors; and
   (b) receiving over one or more communication interfaces one or more instructions from a user interface that is coupled to the EBPP system;
   (c) selecting, by the biller provisioning engine module, one or more of the stored bill presentment and payment capabilities based on the received one or more instructions, wherein selecting comprises accessing configuration parameters for a channel and routing payment instructions, by the routing module, to the payment processing gateway based on the configuration parameters;
   (d) loading input bill data, by the data mapping engine module, wherein the data mapping engine module reformats the input bill data into an EBPP format;

(e) provisioning, by the biller provisioning engine module, a biller on the EBPP system based on the selected bill presentment and payment capabilities wherein the provisioning is configured by at least one of the channel, a facilitator, a biller aggregator, and a biller;

(f) deploying, by the biller provisioning engine module, a test site to verify the bill presentment and payment capabilities including making test payments, wherein deploying the test site includes:
  (i) generating a test environment for the EBPP system; and
  (ii) rendering and validating test payment for the biller;

(g) upon verifying, activating, by the services module, live operation of the EBPP system to perform the selected bill presentment and payment capabilities on the computer server; and (h) processing payments for the biller through the one or more payment processing gateways.

2. The method of claim 1, wherein the one or more communication interfaces is at least one of web, IVR, SMS, WAP, and mobile software application.

3. The method of claim 1, wherein the one or more payment processing gateways provides one or more interfaces to payment networks for processing payments.

4. The method of claim 3, wherein the one or more payment processing gateways process payment transactions for a channel.

5. The method of claim 3, wherein the payment networks are at least one of an aggregator presentment and payment network, electronic funds transfer (EFT) network, credit card network, debit card network, and an Automated Clearing House (ACH) network.

6. The method of claim 1, further comprising presenting one or more bills from the biller using the EBPP system to a customer of the biller through an aggregator presentment and payment network.

7. The method of claim 1, further comprising:
receiving payment information by the EBPP system from an aggregator presentment and payment network for a customer of the biller; and
causing an entity to credit payment to the customer's account.

8. The method of claim 1, wherein one or more bill presentment and payment capabilities is at least one of bill payment without bill presentment, bill payment with short presentment, bill presentment without bill payment, and full bill presentment with bill payment.

9. The method of claim 1, wherein the configuration parameters include channel partner information.

10. The method of claim 1, further comprising processing payments for the biller through one or more payment processing gateways.

11. The method of claim 1, further comprising receiving one or more resources from the user interface that is coupled to the EBPP system that further extends live system operation of the EBPP System.

12. The method of claim 11 wherein the resources are at least one of logos, wave files, Cascading Style Sheets (CSS), billing files, and report template.

13. The method of claim 1, further comprising:
receiving one or more updated instructions from the user interface that is coupled to the EBPP system;
updating, by the biller provisioning engine module, one or more of the stored bill presentment and payment capabilities based on the received one or more updated instructions;

provisioning, by the biller provisioning engine module, a biller on the EBPP system based on the updated bill presentment and payment capabilities;
deploying, by the biller provisioning engine module, an updated test site to verify the updated bill presentment and payment capabilities including making updated test payments while maintaining operation of the EBPP system to perform the selected bill presentment and payment capabilities on the computer server; and
upon verifying, enabling, by the services module, live operation of the EBPP system to perform the updated bill presentment and payment capabilities on the computer server.

14. A system comprising:
a server, the server including:
  one or more processors,
  a routing engine module coupled to one or more payment processing gateways and one or more communication interfaces,
  one or more storage devices coupled to the one or more processors,
  one or more modules, including a biller provisioning engine, a data mapping module, and a services module, implemented by the one or more processors,
  a database including one or more bill presentment and payment capabilities are stored in the database coupled to the EBPP system, and
a user interface on a client computer coupled to the server through the one or more communication interfaces,
  wherein the one or more modules are configured to: (i) receive one or more instructions from the user interface; (ii) select one or more of the stored bill presentment and payment capabilities based on the received one or more instructions using the biller provisioning module, wherein selecting comprises accessing configuration parameters for a channel and routing payment instructions, by the routing module, to the payment processing gateway based on the configuration parameters; (iii) load input bill data using the data mapping engine module that reformats the input bill data into an EBPP format; (iv) provision a biller on the EBPP system based on the selected bill presentment and payment capabilities using the biller provisioning module; (v) deploy a test site to verify the bill presentment and payment capabilities including making test payments using the biller provisioning module; (vi) upon verifying the bill presentment and payment capabilities, enable live operation of the EBPP system to perform the selected bill presentment and payment capabilities using the services module; (vii) present one or more bills from a biller to a customer of the biller through an aggregator presentment and payment network; and (viii) receive payment information from an aggregator presentment and payment network for the customer of the biller and cause an entity to credit payment to the customer's account.

15. The system of claim 14, wherein one or more payment processing gateways provides one or more interfaces to payment networks for processing payments.

16. The system of claim 15, wherein the one or more payment processing gateways process payment transactions for the channel.

17. The system of claim 15, wherein the payment networks are at least one of an aggregator presentment and payment network, an electronic funds transfer (EFT) network, credit card network, debit card network, and an Automated Clearing House (ACH) network.

18. The system of claim 14, wherein one or more bill presentment and payment capabilities at least one of bill payment without bill presentment, bill payment with short presentment, bill presentment without bill payment, and full bill presentment with bill payment.

19. The system of claim 14, wherein the provisioning of biller on the EBPP system is configured by at least one of the channel a facilitator, a biller aggregator, and a biller.

20. The system of claim 14, the system further comprising one or more payment processing gateways and one or more communication interfaces.

21. The system of claim 20, wherein the one or more communication interfaces is at least of web, IVR, SMS, WAP, and mobile software application.

22. The system of claim 14, wherein the one or more modules are further configured to process payments for the biller through the one or more payment processing gateways.

23. The system of claim 14, wherein the one or more module are further configure to receive one or more resources from the user interface that is coupled to the EBPP system that further extends live system operation of the EBPP System.

24. The system of claim 23 wherein the resources are at least one of logos, wave files, Cascading Style Sheets (CSS), billing files, and report template.

25. The system of claim 14, wherein the one or more modules are further configured to:
generate a test environment for the EBPP system; and
render and validating test payment for the biller.

26. The system of claim 14, wherein the one or more modules are further configured to:
receive one or more updated instructions from the user interface that is coupled to the EBPP system;
update one or more of the stored bill presentment and payment capabilities based on the received one or more updated instructions;
provision a biller on the EBPP system based on the updated bill presentment and payment capabilities using the biller provisioning module;
deploy an updated test site to verify the updated bill presentment and payment capabilities including making updated test payments while maintaining operation of the EBPP system to perform the selected bill presentment and payment capabilities on the computer server using the biller provisioning module; and
upon verifying, enable live operation of the EBPP system to perform the updated bill presentment and payment capabilities on the computer server using the services module.

27. A system for managing bill presentment and payment, the system comprising:
a computer server executing an electronic bill presentment and payment (EBPP) system;
a database coupled to the computer server;
one or more modules, including the biller provisioning engine, the data mapping module, and services module, implemented by the computer server;
a user interface;
one or more communication interfaces coupled to the EBPP system;
wherein the computer server configured to:
receive and store a telephone number associated with a mobile device of an entity in the database;
receive and store payment information associated with the entity in the database;
generate an electronic message that includes bill information and sends the electronic message to the mobile device based on the stored telephone number.

28. The system of claim 27, wherein EBPP system is further configured to:
receive one or more instructions from the user interface;
select one or more bill presentment and payment capabilities using the biller provisioning module;
load input bill data by the data mapping engine module that reformats the input bill data into an EBPP format;
provision a biller on the EBPP system based on the selected bill presentment and payment capabilities using the biller provisioning module;
deploy a test site to verify the bill presentment and payment capabilities including making test payments using the biller provisioning module;
upon verifying the bill presentment and payment capabilities, enable live operation of the EBPP system to perform the selected bill presentment and payment capabilities using the services module; and
generates payor workflow based on selected bill presentment and payment capabilities.

29. The system of claim 28, wherein one or more bill presentment and bill payment capabilities is at least one of bill payment without bill presentment, bill payment with short presentment, bill presentment without bill payment, and full bill presentment with bill payment.

30. The system of claim 28, wherein the selected bill presentment and payment capability are configured by at least one of the channel, a facilitator, biller aggregator, and a biller.

31. The system of claim 28, wherein EBPP system is further configured to:
receive one or more updated instructions from the user interface that is coupled to the EBPP system;
update one or more of the stored bill presentment and payment capabilities based on the received one or more updated instructions using the biller provisioning module;
provision a biller on the EBPP system based on the updated bill presentment and payment capabilities using the biller provisioning module;
deploy an updated test site to verify the updated bill presentment and payment capabilities including making updated test payments while maintaining operation of the EBPP system to perform the selected bill presentment and payment capabilities on the computer server using the biller provisioning module; and
upon verifying, enable live operation of the EBPP system to perform the updated bill presentment and payment capabilities on the computer server using the biller services module.

32. The system of claim 27, wherein the electronic message is at least one of a SMS message, text message, and voice message.

33. The system of claim 27, wherein the electronic message provides a hyperlink to a website managed by the EBPP system for a customer to view a bill.

34. The system claim 27, wherein payment information is at least one of credit card information, debit card information, prepaid card information, banking account and bank routing information and ACH information.

35. The system of claim 27, wherein the EBPP system receives payment instructions in the electronic message from a mobile device across a communication network and processes the payment based on payment instructions and payment information.

36. The system of claim 35, wherein the electronic message is routed to the EBPP system across the communication network based on a short code related to the payment instructions.

37. The system of claim 35, wherein the payment instructions includes payment authorization information that is at least one of a password, special phrase, PIN, and account alias.

38. The system of claim 27, wherein the computer server processes the payment information over one or more payment networks coupled to the computer server wherein the payment networks are at least one of an electronic funds transfer (EFT) network, credit card network, debit card network, aggregator presentment and payment network, and an Automated Clearing House (ACH) network.

39. The system of claim 27, wherein the EBPP system receives one or more resources from the user interface that is coupled to the EBPP system that further extends live system operation of the EBPP System.

40. The system of claim 39 wherein the resources are at least one of logos, wave files, Cascading Style Sheets (CSS), billing files, and report template.

41. A system for managing bill presentment and payment, the system comprising:
   (a) a computer server coupled to a communication network and a database, the computer server executing:
      (i) an electronic bill presentment and payment (EBPP) system on which one or more bill presentment and bill payment capabilities are stored in a database coupled to the EBPP system wherein the EBPP system;
   wherein the computer server includes:
      (1) one or more processors,
      (2) a routing engine module coupled to one or more payment processing gateways and one or more communication interfaces,
      (3) one or more storage devices coupled to the one or more processors, and
      (4) one or more modules, including a biller provisioning engine module, a data mapping module, and a services module, implemented by the one or more processors,
   wherein the EBPP system is configured to:
      receive one or more instructions including selecting, by a biller provisioning module, one or more of the stored bill presentment and payment capabilities based on the received one or more instructions through a user interface from a biller, wherein the one or more stored bill presentment and payment capabilities are at least one of bill payment without bill presentment, bill payment with short presentment, bill presentment without bill payment, and full bill presentment and bill payment,
      access configuration parameters for a channel and route by the routing engine payment instructions to a payment processing gateway based on the configuration parameters,
      load input bill data using a data mapping engine module that reformats the input bill data into an EBPP format,
      provision the biller on the EBPP system based on the selected bill payment and presentment capabilities using the biller provisioning module,
      deploy a test site to verify the bill presentment and payment capabilities including making test payments using the biller provisioning module,
      upon verification the bill presentment and payment capabilities, activate the live operation of the EBPP system to perform the selected bill presentment and payment capabilities using a services module, and
      generate payor workflow for live operation of the EBPP system based on the selected bill presentment and payment capabilities; and
   (b) one or more communication interfaces coupled to the EBPP system to provide the selected bill presentment and bill payment capabilities for the biller.

42. The system of claim 41, further comprising a presentment device coupled to the computer server through a communication network.

43. The system of claim 42, wherein the presentment device is at least one of a tablet computer, a mobile phone, and a smartphone wherein a software application capable of presenting and paying bills resides on the presentment device.

44. The system of claim 41, wherein IVR call flows are enabled by the EBPP system based on the selected bill presentment and payment capabilities.

45. The system of claim 41, further comprising a payment server coupled to the EBPP system wherein the payment server receives from the EBPP system one or more payment instructions.

46. The system of claim 41, wherein the one or more communication interfaces is at least one of web, IVR, SMS, WAP, and mobile software application.

47. The system of claim 41, wherein the EBPP system receives one or more resources from the user interface that is coupled to the EBPP system that further extends live system operation of the EBPP System.

48. The system of claim 47 wherein the resources are at least one of logos, wave files, Cascading Style Sheets (CSS), billing files, and report template.

49. The system of claim 41, further comprising the one or more modules are further configured to:
   generate a test environment for the EBPP system; and
   render and validating test payment for the biller.

50. The system of claim 41, wherein EBPP system is further configured to:
   receive one or more updated instructions from the user interface that is coupled to the EBPP system;
   update one or more of the stored bill presentment and payment capabilities based on the received one or more updated instructions using the biller provisioning module;
   provision a biller on the EBPP system based on the updated bill presentment and payment capabilities using the biller provisioning module;
   deploy an updated test site to verify the updated bill presentment and payment capabilities including making updated test payments while maintaining operation of the EBPP system to perform the selected bill presentment and payment capabilities on the computer server using the biller provisioning module; and
   upon verifying, enable live operation of the EBPP system to perform the updated bill presentment and payment capabilities on the computer server using the services module.

51. A system for managing bill presentment and payment, the system comprising:

a computer server executing an electronic bill presentment and payment (EBPP) system, wherein one or more bill presentment and payment capabilities are stored by the EBPP system;

a database coupled to the computer server;

one or more communication interfaces coupled to the EBPP system to provide bill presentment and payment capability to one or more billers using the bill presentment and payment capabilities;

wherein the computer server is configured to:

receive one or more instructions from a user interface;

select one or more bill presentment and payment capabilities using a biller provisioning module;

load input bill data using a data mapping engine module that reformats the input bill data into an EBPP format;

provision a biller on the EBPP system based on the selected bill presentment and payment capabilities using the biller provisioning module;

deploy a test site to verify the bill presentment and payment capabilities including making test payments using the biller provisioning module;

upon verifying, enable live operation of the EBPP system to perform the selected bill presentment and payment capabilities using a services module;

store a telephone number of a mobile device storing in the database;

wherein the EBPP system receives payment instructions in an electronic message from a mobile device associated with the stored telephone number across a communication network and processes the payment based on payment instructions and payment information.

52. The system of claim 51, wherein the central billing computer server is further configured to:

receive one or more updated instructions from the user interface that is coupled to the EBPP system;

update one or more of the stored bill presentment and payment capabilities based on the received one or more updated instructions using the biller provisioning module;

provision a biller on the EBPP system based on the updated bill presentment and payment capabilities using the biller provisioning module;

deploy an updated test site to verify the updated bill presentment and payment capabilities including making updated test payments while maintaining operation of the EBPP system to perform the selected bill presentment and payment capabilities on the computer server using the biller provisioning module; and upon verifying, enable live operation of the EBPP system to perform the updated bill presentment and payment capabilities on the computer server using the services module.

* * * * *